US010810655B2

(12) United States Patent
Gutnik et al.

(10) Patent No.: US 10,810,655 B2
(45) Date of Patent: Oct. 20, 2020

(54) GENERATING CATALOG-ITEM RECOMMENDATIONS BASED ON SOCIAL GRAPH DATA

(71) Applicant: Facebook, Inc., Menlo Park, CA (US)

(72) Inventors: Gery Gutnik, San Francisco, CA (US); Mark J. Kilgore, Menlo Park, CA (US); Ken Deeter, Belmont, CA (US)

(73) Assignee: Facebook, Inc., Menlo Park, CA (US)

( * ) Notice: Subject to any disclaimer, the term of this patent is extended or adjusted under 35 U.S.C. 154(b) by 247 days.

(21) Appl. No.: 15/862,398

(22) Filed: Jan. 4, 2018

(65) Prior Publication Data

US 2019/0205973 A1 Jul. 4, 2019

(51) Int. Cl.
*G06Q 30/00* (2012.01)
*G06Q 30/06* (2012.01)
*G06Q 50/00* (2012.01)
*G06Q 30/02* (2012.01)
*H04W 4/21* (2018.01)

(52) U.S. Cl.
CPC ..... *G06Q 30/0641* (2013.01); *G06Q 30/0261* (2013.01); *G06Q 30/0267* (2013.01); *G06Q 30/0631* (2013.01); *G06Q 50/01* (2013.01); *H04W 4/21* (2018.02)

(58) Field of Classification Search
None
See application file for complete search history.

(56) References Cited

U.S. PATENT DOCUMENTS

| | | | |
|---|---|---|---|
| 10,068,257 B1* | 9/2018 | Mosthaf | G06Q 30/0631 |
| 2006/0010037 A1* | 1/2006 | Angert | G06Q 10/087 |
| | | | 705/15 |
| 2013/0091130 A1* | 4/2013 | Barrow | G06F 16/951 |
| | | | 707/723 |
| 2013/0216982 A1* | 8/2013 | Bennett | G09B 5/00 |
| | | | 434/127 |
| 2013/0218880 A1* | 8/2013 | McConnell | G06Q 30/01 |
| | | | 707/724 |
| 2017/0091661 A1* | 3/2017 | Sanchez | G06N 5/04 |

* cited by examiner

*Primary Examiner* — Mila Airapetian
(74) *Attorney, Agent, or Firm* — Baker Botts L.L.P.

(57) ABSTRACT

In one embodiment, a method includes receiving one or more order parameters from a client system of a first user of an online social network. The order parameters may include an identifier associated with the first user and a location of the client system. The method also includes receiving references to catalog items from third-party vendors. Each reference may be associated with one or more metadata items. The method also includes scoring each reference based at least in part on the one or more order parameters and the one or more metadata items. The method also includes sending to the client system of the first user one or more references of that has a score above a threshold score.

20 Claims, 19 Drawing Sheets

GENERATING CATALOG-ITEM RECOMMENDATIONS BASED ON SOCIAL GRAPH DATA

TECHNICAL FIELD

This disclosure generally relates to identifying and recommending content objects based on social-networking information.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, a social-networking system may send order and delivery recommendations to a user based on the user's social-networking information and metadata items associated with catalog items from third-party vendors. As an example, a user may wish to order food through the online social network and have it delivered to her house. The user may input order parameters, such as her desired cost, her food preferences, her desired amount of wait time, or any other suitable parameter. Additionally or in the alternative, the social-networking system may access a social graph to determine the user's preferences. For example, the user may have liked three posts about Mexican food: a recipe for 7 layer bean dip, a post from a friend about her meal at a local taqueria, and a video about why corn tortillas are better than flour tortillas. From this, the social-networking system may estimate the user's affinity for Mexican food. The social-networking system may perform similar analyses for other food types, other restaurants, or any other suitable entity or concept on the online social network to generate a user-preference vector for the user. The social-networking system may also access metadata associated with catalog items from third-party vendors to generate catalog-item vectors for several different catalog items. The social-networking system may then identify or generate recommendations based on the similarity between the user-preference vector and the catalog-item vectors. The social-networking system may send the recommendations to the user's client system for display.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
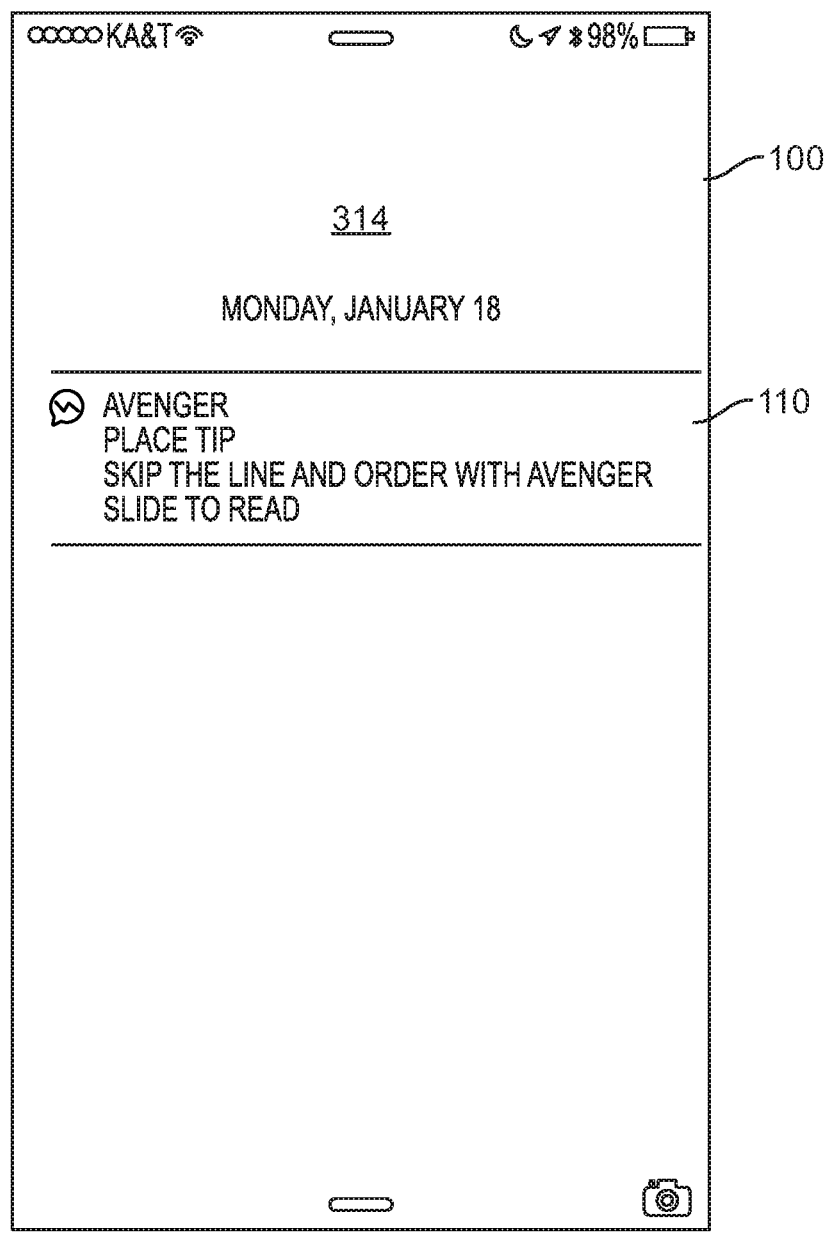
FIG. 1 illustrates an example user interface for providing a recommendation to a user.

Particular embodiments may provide for a social-networking system that sends recommendations to a user based on the user's location, an available catalog from a nearby vendor, and social graph information related to the user. As an example and not by way of limitation, a user may enter a restaurant that serves Mexican food. The restaurant may have a long line until the user may order at the counter or a long wait until the user may be seated at a table. If the user has location-services enabled on her client device, the social-networking system may receive location data associated with the client device and determine that the user is inside the Mexican restaurant. The social-networking system may provide recommendations to the user based on information stored in association with her social graph. Such information may include past orders, photos posted by the user, photos that the user has interacted with (e.g., liked, commented on, shared), or any other suitable information stored in association with the social graph. As an example and not by way of limitation, the social-networking system may send the user a recommendation to "skip the line" and order menu items from the Mexican restaurant through an online service (e.g., a website or an application) associated with either the social-networking system or the Mexican restaurant. The social-networking system may also recommend particular menu items that the user might enjoy.

In particular embodiments, the social-networking system may receive an indication that a user has posted a content object or interacted with a content object on the online social network. As an example and not by way of limitation, the social-networking system may receive an indication that a user Alex has posted a photo of buffalo wings from the restaurant "Wings n' Rings" in the city that Alex lives in. Alex may caption the photo as "Amazing wings!" and also include a geographic location tag (e.g., "geotag") of where the photo was taken, along with the name of the restaurant: "Wings n' Rings." In response to this indication, the social-networking system may generate a node in a social graph that corresponds to buffalo wings generally, and in particular embodiments, may generate a node that corresponds to the particular buffalo wings sold at Wings n' Rings. The social-networking system may also generate an edge connection between a user node corresponding to Alex and the node corresponding to the buffalo wings. This may enable the social-networking system to determine that Alex has an affinity for buffalo wings generally, and specifically for the buffalo wings sold at Wings n' Rings.

In particular embodiments, the social-networking system may generate one or more nodes based on received information from a third-party entity. The third-party may be any suitable entity, such as a restaurant, amusement park, shopping mall, department store, school or university, private company, or public company. The third-party entity may maintain online information related to itself or the services and products that it offers. As an example and not by way of limitation, a restaurant may maintain a menu with various menu items. As another example and not by way of limitation, a shopping mall may maintain as list of stores and products offered within those stores. As another example and not by way of limitation, a university may maintain a list of classes or other academic services. The social-networking system may receive or otherwise access the information from the third party and identify content objects from the information. The content objects may be any suitable information. As an example and not by way of limitation, the social-networking system may generate a content object for each menu item of a particular restaurant. As another example and not by way of limitation, the social-networking system may generate a content object for each store or product in a shopping mall. As another example and not by way of limitation, the social-networking system may generate a content object for each class offered by a university. The social-networking may create a node in the social graph that corresponds to each content object. Although this disclosure describes generating a node in a social graph in a particular manner, this disclosure contemplates generating a node in a social graph in any suitable manner.

In particular embodiments, regardless of how the nodes are generated (e.g., in response to a content object posted on the online social network or in response to accessing information about a third-party entity), when a user posts or interacts with a content object on the online social network, the social-networking system may create an edge connection between the user node correspond to the user and the node corresponding to the content object. Posting or interacting with a content object on the online social network may include any suitable action, such as posting a photo, writing a status update, liking the content object, sharing the content object, or commenting on a post associated with the content object. As an example and not by way of limitation, if the user likes a photo of a double bacon cheeseburger, the social-networking system may generate an edge connection between the user node corresponding to the user and the node corresponding to a double bacon cheeseburger. The node corresponding to the double bacon cheeseburger may be general, may correspond to a specific menu item offered by a particular restaurant, or may correspond to both double bacon cheeseburgers generally and a specific menu item. In particular embodiments, the social-networking system may generate an edge connection between a user node and another node corresponding to a catalog item when the user orders the catalog item through the online social network. As an example and not by way of limitation, when a user orders a wet green burrito from a local taqueria through a mobile application associated with the social-networking system, the social-networking system may record this transaction and create an edge connection between the user node corresponding to the user and the node corresponding to the wet green burrito.

FIG. 1 illustrates an example user interface 100 for providing a recommendation 110 to a user. The user interface 100 may be a lock-screen interface. This may be an interface that appears when the client system is in a locked state. The social-networking system may send a recommendation 110 in the form of a notification or message to the client system of the user. The recommendation 110 may be any suitable recommendation related to the user, the location that the user is in, an entity associated with the location the user is in, or any other suitable information. As an example and not by way of limitation, a user may have entered a fast-food restaurant. The social-networking system may determine that a user has entered a fast-food restaurant. The determination may be made by any suitable means, including GPS coordinates, a beacon inside the restaurant that communicates with the user's client system to determine if the user's client system is located within the building, or any other suitable method. The social-networking system may determine that at this particular restaurant, customers order at the counter after waiting in line. This information may be designated by the restaurant itself or by one or more users of the restaurant. The social-networking system may also determine that there is currently a long wait-time based on third-party data or based on the current GPS coordinates for multiple client systems of multiple users of the online social networking system. The current GPS coordinates of these users may indicate that they have been waiting in line for some time. Because of this, the social-networking system may determine that the user is waiting in line at the fast food restaurant. In response, the social-networking system may determine a recommendation for the user that says "Place tip. Skip the line and order with messenger." Although this disclosure uses a particular phrase for the recommendation 110, this disclosure contemplates any suitable phrase for recommendation 110. Examples of phrases include "In line at IN N' OUT? Skip the line by ordering here," "Try ordering a cheeseburger through the app!" or any other suitable phrase that would invite the user to use a mobile ordering module provided at least in part by the social-networking system.

Figure 2:
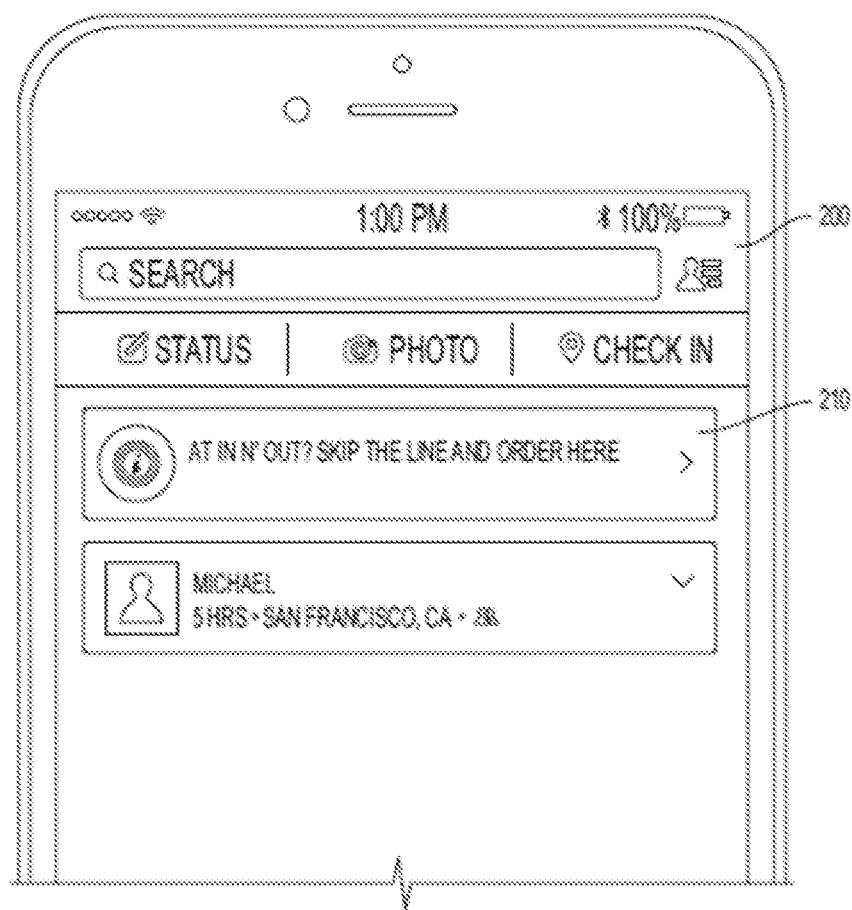
FIG. 2 illustrates another example user interface for providing a recommendation to a user.

FIG. 2 illustrates another example user interface 200 for providing a recommendation 210 to a user. The user interface 200 may be an interface that appears when the user opens an application associated with the online social network. Recommendation 210 may appear at the top of user interface 200, or in any other suitable location on interface 200. Recommendation 210 may be a selectable icon that the user may tap or otherwise select to proceed to a mobile ordering interface (not illustrated). User interface 200 may function similarly to user interface 100, except that it may appear within an application associated with the online social network instead of as a message notification. The text of recommendation 210 may be any suitable text, including "At IN N' OUT? Skip the line and order here." Alternatively or in addition, the text of recommendation 210 or recommendation 110 may include catalog items from the third-party entity associated with the location, that may be recommended to the user based on the social-networking information of the user. As an example and not by way of limitation, the text of recommendation 210 may state, "Alex, at Wings n' Rings? Try the spicy buffalo wings—order them by tapping here." If the user selects the recommendation 210, the social-networking system may send instructions to the user's client system to display a mobile ordering interface. The mobile ordering interface may be generated and maintained by the social-networking system or it may be generated and maintained by a third-party entity. The social-networking system may build a platform that third-party entities may integrate with, so that when a user selects to order an item from a particular entity, the user may be presented with a website associated with the entity that is displayed in an i-frame in an application of the social-networking system.

Figure 3:
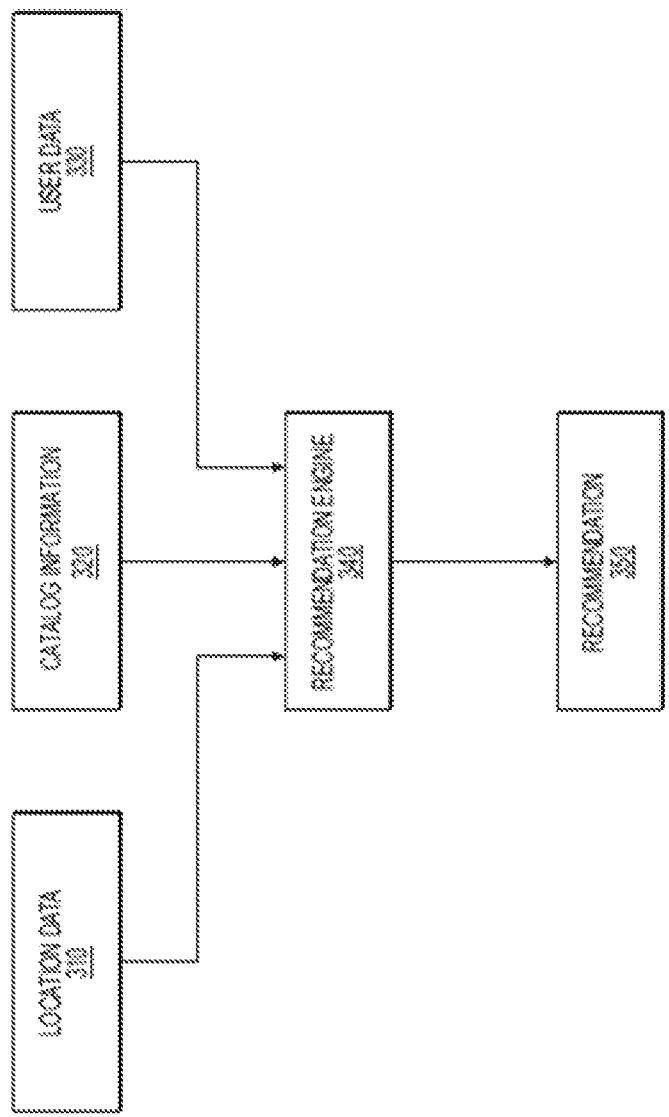
FIG. 3 illustrates an example block diagram for providing a recommendation to a user.

FIG. 3 illustrates an example method for providing a recommendation to a user. A recommendation engine 340 may make recommendations for a user based on location data 310 associated with a client system of the user, catalog information 320, and user data 330. The catalog information 320 may be provided by a third-party entity and may contain information related to products or services that the entity offers to users. As an example and not by way of limitation, the catalog information may be a list of menu items offered at Mexican Restaurant. Each item on the menu may have associated metadata. The menu-item metadata may include price, average rating, nutritional information (e.g., calories, sodium content, grams of fat, carbohydrates, protein, and sugar), the frequency with which that menu item is ordered (popularity), average amount of time it takes that item to be prepared and served, or any other suitable metric. As an example and not by way of limitation, Mexican Restaurant may offer five menu items that have the following metadata:

TABLE 1

Example Menu Items and Associated Metadata

| Name | Price | Rating | Calories | Carbs | Fat | Protein |
| --- | --- | --- | --- | --- | --- | --- |
| Burrito | $15.99 | 4.3 | 710 | 79 | 32 | 35 |
| Enchiladas | $13.99 | 4.1 | 532 | 27 | 25 | 46 |
| Nachos | $ 9.99 | 3.7 | 346 | 36 | 10 | 7 |
| Tacos | $11.99 | 4.5 | 611 | 52 | 21 | 29 |
| Quesadilla | $12.99 | 3.9 | 431 | 43 | 20 | 17 |

User data 330 may be gathered and maintained by the social-networking system. User data 330 may include an order history and information contained in the social graph. In particular embodiments, the order history may also be contained in the social graph. The order history may include past purchases made by the user either through the online social-network or through a third-party, subject to privacy settings of the user or the third-party. The order history may also include past food orders made by the user one or more restaurants. As an example and not by way of limitation, the user may have ordered the nachos from Mexican Restaurant four times in the past two months. This information may be stored by the social-networking system. The information contained in the social graph may be nodes and edges connecting to the nodes, as discussed above. The nodes may include a user node corresponding to the user. The nodes may also include second nodes that correspond to entities, menu items, locations, or any other suitable thing. The second nodes may be connected to the user node by edges. Each edge may have its own edge type that represents a particular action the user has performed on the online social network. As an example and not by way of limitation, a user may order tacos from Mexican Restaurant. The social graph may be updated to include an edge between the user node and a second node corresponding to tacos from Mexican Restaurant. The edge may have an "ordered" edge-type. Further, if the user selects a "like" icon associated with the tacos, another edge connection with a "liked" edge-type may be formed between the user node and the second node corresponding to the tacos. In particular embodiments, a single edge may include data associated with all the actions the user has taken with respect to the node connected by the edge to the user node.

In particular embodiments, determining one or more recommendations 350 may be based on one or more weights that are each assigned to one of the one or more edges based on the respective edge-type. An edge may be associated with an affinity coefficient, which may represent the strength of a relationship between the user and the entity or concept represented by the second node. In addition or as an alternative to what is discussed elsewhere in this disclosure, the social-networking system may calculate the affinity coefficient by processing the user's actions on the online social network with respect to a particular entity or concept. Each action may be associated with a particular weight that is used to factor the overall affinity coefficient. As an example and not by way of limitation, an affinity coefficient α for a particular edge may be α=Ax+By+ . . . +Cz, where A, B, . . . C represent particular actions the user has taken on the online social network with respect to a particular entity or concept, and x, y, . . . z represent the weights associated with each action. As an example and not by way of limitation, A may represent ordering a menu item using an application of the online social network and may be weighted the heaviest. Thus x may be 0.75. B may represent posting content related to the menu item on the online social network, such as "this was the spiciest burrito!" and be weighted slightly less heavy than ordering the menu item. Thus y may be 0.50. C may represent liking or otherwise reacting positively to a content object associated with the menu item and may be weighted the less than posting content. Thus z may be 0.25. Other actions may receive different weights, such as sharing a content object related to a menu item, commenting on a post about a particular menu item, or any other suitable action associated with the online social network. Each action A, B, . . . C (e.g., ordering, posting, liking, commenting, sharing) may be assigned a "1" or a "0" depending on whether or not the user has performed that action with respect to the particular menu item. Note that in particular embodiments the affinity coefficient may exceed 1. As an example and not by way of limitation, a user may order the nachos from Mexican Restaurant three times, post a photo of the nachos once, and like another friend's photo of the nachos once. Thus, the user's affinity coefficient for nachos may be α=3Ax+By+Cz=3(1)(0.75)+(1)(0.5)+(1)(0.25)=3.0. This affinity coefficient may be included in the user data 330 for this particular user. Likewise, affinity coefficients for any edge connection between a user node and a second node may be included in the user data 330 for any suitable user.

The recommendation engine 340 may access location data 310 as described herein, catalog information 320 as described herein, and user data 330 as described herein to make a recommendation 350 for a particular user. The recommendation 350 may be made by ranking the catalog information 320 based at least in part on the user data 330. In particular embodiments, the menu items may be ranked based on the affinity coefficients between the user and each menu item. As an example and not by way of limitation, the social-networking system may access the affinity coefficients between a user node and each item at Mexican Restaurant. The affinity coefficients may be as follows: burrito—1.25; enchiladas—3.5; nachos—1.00; tacos—2.75; quesadilla—0.50. Thus, the recommendations may be ranked in descending order based on the respective affinity coefficients. In particular embodiments, the social-networking system may consider other user data 330 and other catalog information 320. The menu item metadata may be included in the catalog information 320. As an example and not by way of limitation, the information included in Table 1 may be included in the catalog information 320. The recommendation engine 430 may make recommendations based on this metadata along with user data 330. As an example and not by way of limitation, the user may have specified that he is trying to lose weight, either by directly specifying this with relation to the recommendation engine (e.g., as part of an initial survey), or by posting or otherwise interacting with weight-loss related content to the online social network (e.g., posting a photo of himself with the hashtag "weightloss"). If the social-networking system determines that the user has specific dietary preferences (such as low-fat or high protein food), the social-networking system may uprank menu items that match the user's preferences. As an example and not by way of limitation, the social-networking system may analyze the protein-to-carbs ratio for each menu item offered as shown in Table 1. Since the enchiladas have the highest protein-to-carb ratio at 1.7, the social-networking system may uprank the enchiladas based on this determination. The same analysis may be applied to other food preferences or restrictions, such as food allergies (e.g., downrank or remove recommendations that include gluten if the user has celiac disease), vegetarianism or veganism (e.g., remove recommendations that include meat), and any other suitable preference.

In particular embodiments, when recommendation engine 340 determines recommendations 350 for a first user, it may rank recommendations 350 based on the social-networking activity of "lookalike" users with respect to the first user. Lookalike users may be users that have similar attributes (e.g., social-networking traits) as the first user. In prior search engine systems, when processing a search query or performing some other type of information retrieval (such as catalog item recommendation) for a particular user, the search engine system may rank the search results based on the relevance of the individual search result or catalog item to the query, but not necessarily the relevance of the search result to the querying user. This may lead to users performing multiple queries or scroll through several catalog items to find relevant results, consuming additional time and processing resources. By using lookalike user data, the social-networking system may base information retrieval on how other users that are similar to the first user have interacted with content objects (e.g., menu items) at locations similar to where the first user is located. This may provide a more customized recommendation and catalog ordering experience and may provide recommendations more efficiently and reduce the requisite processing power by reducing the number of catalog items the user must look at before deciding to order a catalog item.

In particular embodiments, the recommendation engine 240 may base recommendation 350 on lookalike data of one or more lookalike users with respect to the first user. The first user may correspond to a first user-vector. One or more lookalike users may be selected from several second users of the online social network. Each second user may correspond to a second-user vector. Each user-vector may be an N-dimensional vector representing the respective user in an N-dimensional vector space. Each dimension of the user-vector may correspond to a social-networking trait of the respective user. Each second user may be selected based on a vector similarity between the first user-vector and the second-user vector corresponding to the respective second user.

The social-networking system may determine whether users A and B are lookalike users by representing each user as a user-vector having N dimensions in an N-dimensional vector space. Each dimension in the vector space may correspond to a particular social-networking trait. After the social-networking system has generated user-vectors for two or more users, it may measure the vector similarity (e.g., Hamming distance, cosine similarity, Euclidean distance) between the two user-vectors to determine if the users may be deemed to be lookalike users. A user may be considered a lookalike user with respect to the querying user if, for example, the cosine similarity between their respective user-vectors is above a threshold similarity value. As an example and not by way of limitation, a user a user Alex may be a Mexican-American male, aged 24, who attends Stanford University, and who has liked the Tim Duncan fan page, and has checked-in at Umami Burger in Palo Alto, Calif. Each of these pieces of information relating to Alex's social-networking activity may be coded and become part of a user-vector that represents Alex. The social-networking system 160 may create a user-vector for Alex that may look something like, <2, 5, 0, 0, 3, −2>, where each value in the vector represents some trait (e.g., 2=male, 5=age 21-25; −2=likes Tim Duncan). This user-vector may have more or fewer dimensions depending on the number of social-networking traits considered when determining lookalikes and the amount of information available to the social-networking system 160. If two users have a vector similarity value above a threshold similarity value (e.g., a cosine similarity greater than 0.7), they may be deemed to be lookalike users. Depending on the threshold, the querying user may have tens, hundreds, or thousands of lookalike users.

When the recommendation engine 340 determines that a first user is within a threshold proximity to a specified area (e.g., inside Mexican Restaurant), it may identify catalog items (e.g., menu items) offered by the entity associated with the specified area. The recommendation engine 340 may then access lookalike data. The lookalike data may be actions that other users who are lookalike users with respect to the first user have taken on the online social network. Specifically, the lookalike data may be actions those users have taken with respect to catalog items associated with the entity in the specified area or with other equivalent entities. As an example and not by way of limitation, the recommendation engine 340 may access lookalike data for users who have eaten at Mexican Restaurant or other Mexican restaurants. The lookalike data that is accessed may be an order history for each lookalike user. For example, a user may have ordered the cheese and chicken enchiladas seven times in the last three weeks. Additionally, the lookalike data may reveal that several users have ordered the cheese and chicken enchiladas and have given that menu item an average rating of 4.4 out of 5. Since it is likely that the first user may have similar food preferences as a lookalike user, the social-networking system may recommend the chicken enchiladas to the first user based on the lookalike data.

Figure 4:
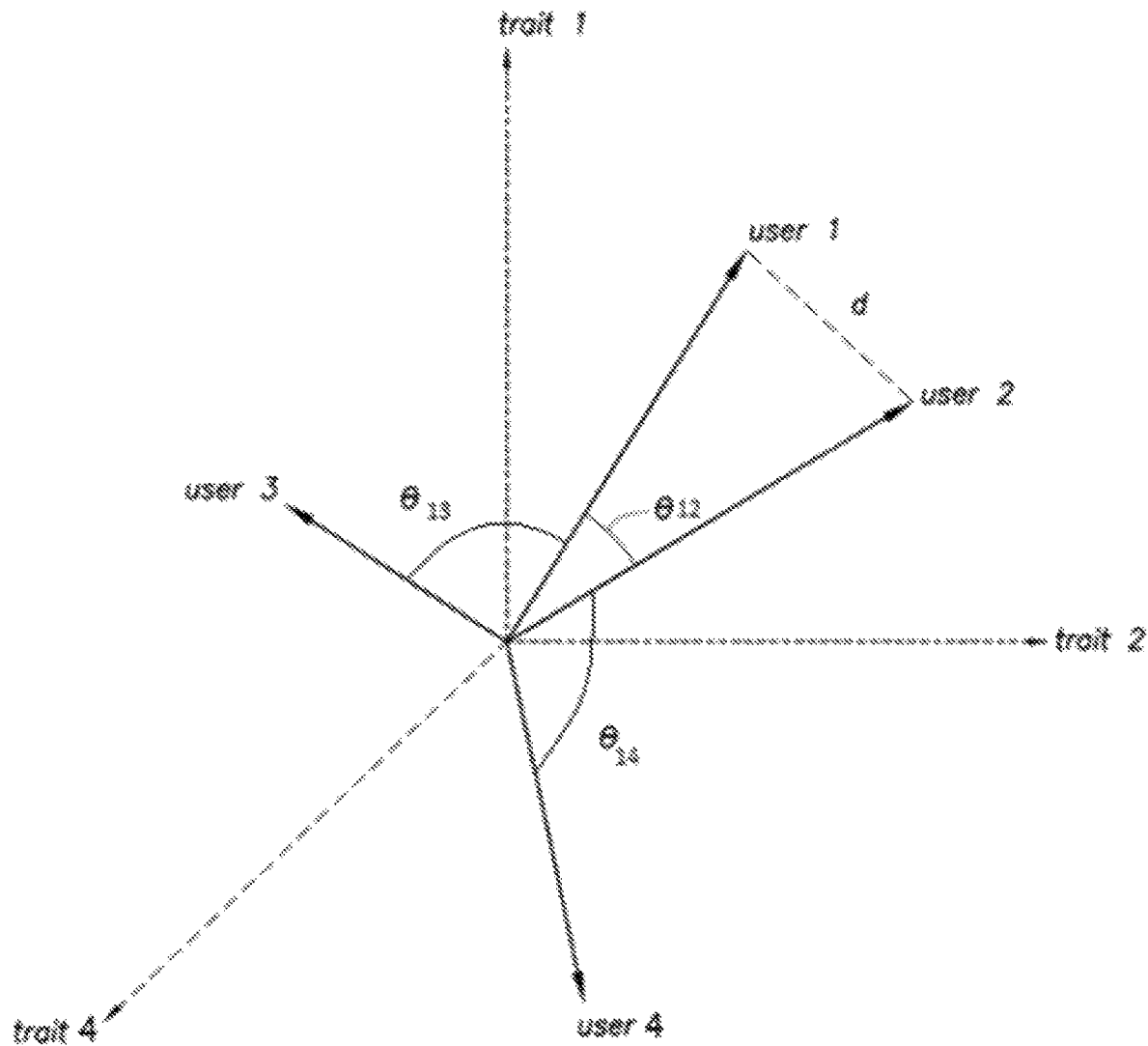
FIG. 4 illustrates an example view of a vector space.

FIG. 4 illustrates an example view of a vector space. In particular embodiments, users may be represented as user-vectors in an N-dimensional vector space, wherein N denotes any suitable number of dimensions. Although the vector space in FIG. 4 is illustrated as a three-dimensional space, this is for illustrative purposes only, as the vector space may be of any suitable dimension (e.g., 128 dimensions). Each user-vector may be mapped onto the vector space. As an example and not by way of limitation, FIG. 4 illustrates four user-vectors representing user 1, user 2, user 3, and user 4. For discussion purposes, user 1 may be considered to be the user that is receiving the recommendations of FIGS. 1 and 2. The social-networking system 160 may identify users that are lookalike users with respect to user 1 by measuring the similarity between the user-vector representing user 1 and the user-vectors representing each of the other users, respectively. Similarity may be measured in a number of different ways, including cosine similarity, Euclidean distance between the vector end-points, or any other suitable method. As an example and not by way of limitation, the angle between the user-vectors representing user 1 and user 2 in FIG. 4 may be θ12. A threshold similarity may be determined, wherein user 2 may be a lookalike user with respect to user 1 if the vector similarity between their respective user-vectors is greater than the threshold similarity. As an example and not by way of limitation, the angle θ12 between the user-vectors representing user 1 and user 2 may indicate that the vector similarity between the vectors is above the threshold similarity. Thus, user 1 and user 2 may be lookalike users. The angle θ13 between user 1 and user 3, on the other hand, may be such that their vector similarity does not meet the threshold similarity. Thus, user 3 may not be a lookalike user with respect to user 1. The same may be said of the angle θ14 between user 1 and user 4. User 4 may not be a lookalike user with respect to user 1 because the angle θ14 is too large. In particular embodiments, the social-networking system 160 may consider the Euclidean distance d between the embeddings (i.e., mappings or projections of the vectors in the N-dimensional vector space) of the user-vectors in addition to or in place of cosine similarity or other angle measurement similarity. In particular embodiments, for two users to be lookalike users, the angle θ between their respective user vectors and the Euclidean distance d may both need to meet threshold values. As an example and not by way of limitation, for user 1 and user 2 to be lookalike users, the cosine similarity between their respective user-vectors must be greater than 0.8 (i.e., angle $\theta_{12}$ must be less than or equal to 37 degrees), and the Euclidean distance between the terminal points of the user-vectors representing user 1 and user 2 must be below 5.0. A user may provide information to the social-networking system 160 by updating a user profile associated with the user with information about the user (e.g., age, relationship status, political views, interests, favorite movies, books, quotes and the like), and by interacting with content objects on the online social network (e.g., liking user posts, commenting on photos, sharing articles, posting status updates). Although this disclosure describes measuring the similarity between users in a particular manner, this disclosure contemplates measuring the similarity between users in any suitable manner.

In particular embodiments, users may be represented as binary user-vectors, wherein each value in a particular dimension in an N-dimensional user-vector is a 1 or a 0. As an example and not by way of limitation, a first binary user-vector for a user, Louie, may be <1,1,1,0,1,0,1,0>, and a second binary user-vector for another user, Quincy, may be <1,0,1,1,1,0,1,0>. These binary user-vectors may represent any suitable information relating to users of the online social network, such as whether or not the user has liked particular content objects (e.g., posts, photos, profile pages). The social-networking system 160 may calculate the similarity between Louie and Quincy by calculating the Hamming distance between the binary user-vectors for Louie and Quincy. The Hamming distance between two vectors of equal length may be the number of positions at which their corresponding bits are different. In other words, it measures the minimum number of substitutions required to change the first vector to the second vector. Thus, the difference between the binary-user vectors that represent Louie and Quincy may be 2, because two bits may need to be changed in the first binary user-vector to obtain the second binary user-vector. If the threshold Hamming distance of two binary user-vectors to be sufficiently similar for two users to be lookalike users is 3 or under, Quincy and Louie may be lookalike users, because the Hamming distance between Louie and Quincy's binary user-vectors is 2. Although this disclosure describes calculating the similarity between users in a particular manner, this disclosure contemplates calculating the similarity between users in any suitable manner.

In particular embodiments, in addition or in the alternative to making recommendations for individual catalog items, the social-networking system may recommend a family of complementary items to the user. As an example and not by way of limitation, the social-networking system may create a personalized meal recommendation for the user. The user may have previously specified that he is currently on a Paleo diet. As a result, the social-networking system may identify food items that are Paleo-friendly and recommend those items to the user. The social-networking system may recommend the spinach chicken soup as an appetizer, the steak and asparagus plate as a main course, and the paleo pumpkin pie for dessert. Although this disclosure describes recommending catalog items in a particular manner, this disclosure contemplates recommending catalog items in any suitable manner.

Figure 5:
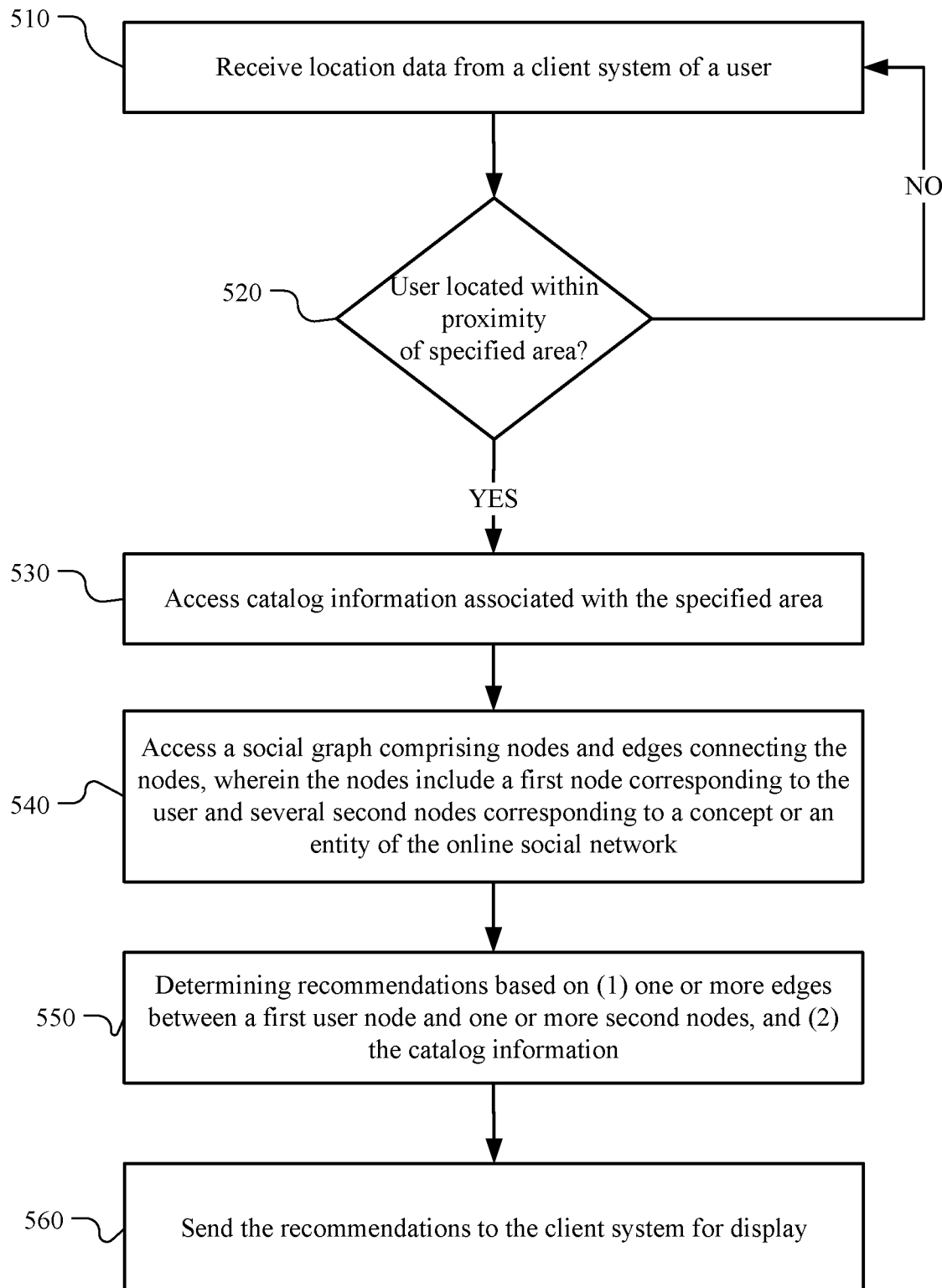
FIG. 5 illustrates an example method for recommending catalog items to a user of an online social network.

FIG. 5 illustrates an example method 500 for recommending catalog items to a user of an online social network. The method may begin at step 510, where the social-networking system may receive location data from a client system of a user. At step 520, the social-networking system may determine that the user is located within proximity of a specified area. At step 530, the social-networking system may access catalog information associated with the specified area. At step 540, the social-networking system may access a social graph comprising nodes and edges connecting the nodes, wherein the nodes include a first node corresponding to the user and several second nodes corresponding to a concept or an entity of the online social network. At step 550, the social-networking system may determine one or more recommendations for the user based on (1) one or more edges between a first user node and one or more second nodes, and (2) the catalog information. At step 560, the social-networking system may send the recommendations to the client system for display. Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for recommending catalog items to a user of an online social network including the particular steps of the method of FIG. 5, this disclosure contemplates any suitable method for recommending catalog items to a user of an online social network including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
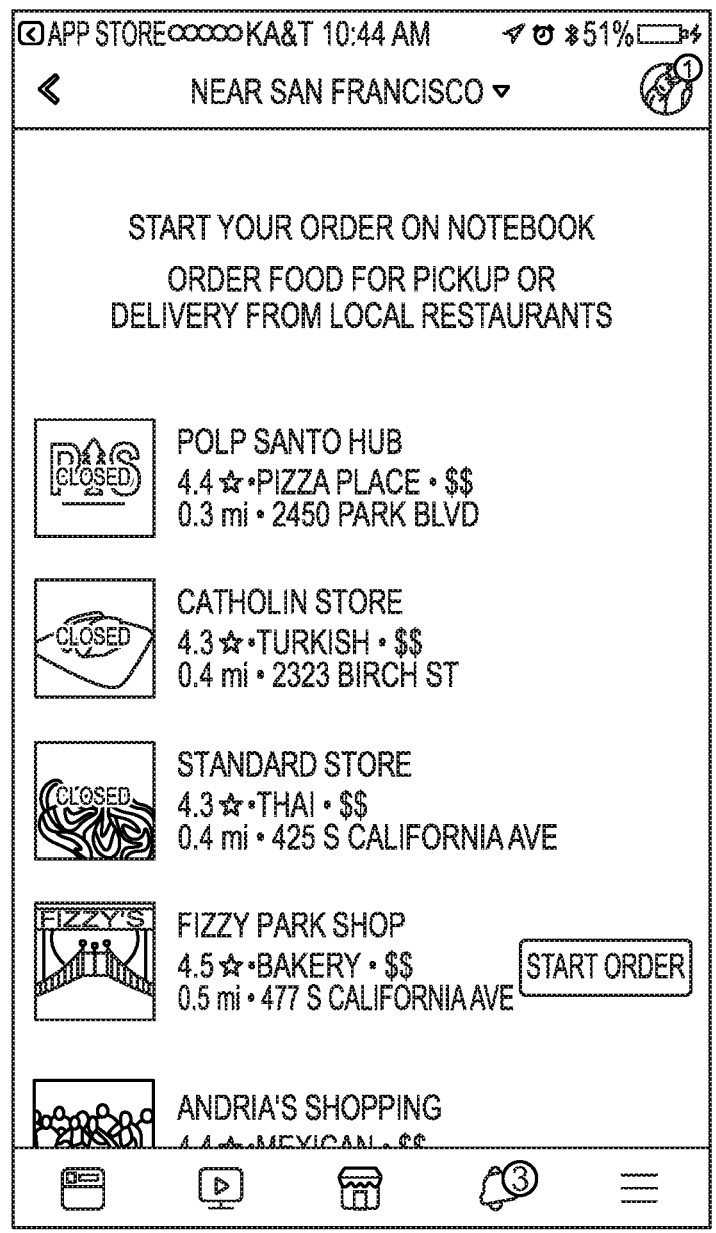
FIG. 6 illustrates an example vendor selection interface.

FIG. 6 illustrates an example vendor selection interface. By way of example and not of limitation, the example vendor selection interface depicted in FIG. 6 may be a food ordering interface. This may be an initial interface that a user may encounter when attempting to order items via an application associated with the online social network. The vendor selection interface may include several references to vendors. The references may be categorized or ranked according to at least some of the embodiments disclosed herein. A user may select any of these references to learn more about each vendor, or may select an icon that says "start order" to begin ordering items from that vendor. The references may also include an indication that the vendor is currently closed, if that is the case. The references may also include additional information related to the vendor, such as hours of operation, average user rating, address, distance to the user, phone number, or any other suitable information. Although this disclosure describes a particular vendor selection interface illustrated in a particular manner, this disclosure contemplates any suitable vendor selection interface illustrated in any suitable manner.

Figure 7:
FIG. 7 illustrates an example catalog-type selection interface.

FIG. 7 illustrates an example catalog-type selection interface. The catalog-type selection interface depicted in FIG. 7 may be a food-type selection interface. This interface may be displayed on the user's client system if the user scrolls down past the vendor-selection interface. The food-type selection interface may include several food types (or "cuisines") that the user may select from. As an example but not by way of limitation, a user may not initially see any restaurants that interest her on the vendor-selection interface. Thus, she may scroll down to select from the food-type selection interface and choose from the following food-types: Mexican, fast food, Chinese, delis, sandwiches, pizza, or any other suitable food type. The user may select one of these food-types and may be presented with another interface that includes vendors of the selected food type. As an example and not by way of limitation, the user may select "Mexican," and the social-networking system may send instructions to present on the client system another vendor-selection interface, which is described with reference to FIG. 8. Although this disclosure describes a particular food-type selection interface illustrated in a particular manner, this disclosure contemplates any suitable food-type selection interface illustrated in any suitable manner.

Figure 8:
FIG. 8 illustrates another example vendor-selection interface.

FIG. 8 illustrates another example vendor-selection interface. This interface may be different from the vendor-selection interface depicted in FIG. 6 in that the vendor-selection interface of FIG. 8 may include references to vendors of a particular food-type, rather than references to vendors of multiple different food types. As an example and not by way of limitation, the vendor-selection interface of FIG. 8 may include references to Mexican restaurants. These references may be displayed in response to the user's selection of Mexican restaurants in the food-type selection interface. References to the following vendors may be displayed Mexican Restaurant, and Taqueria. A user may select any of these references to learn more about each vendor, or may select an icon that says "start order" to begin ordering items from that vendor. The references may also include an indication that the vendor is currently closed, if that is the case. The references may also include additional information related to the vendor, such as hours of operation, average user rating, address, distance to the user, phone number, or any other suitable information. Although this disclosure describes a particular vendor selection interface illustrated in a particular manner, this disclosure contemplates any suitable vendor selection interface illustrated in any suitable manner.

Figure 9:
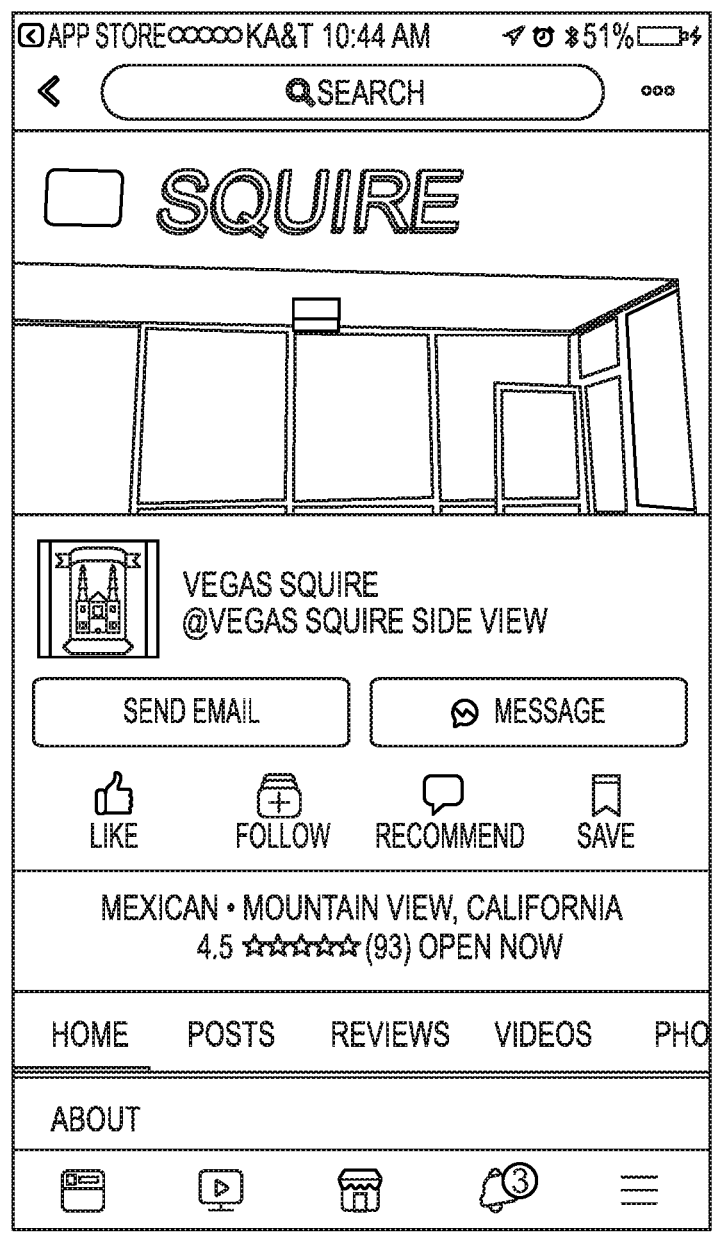
FIG. 9 illustrates an example vendor interface.

FIG. 9 illustrates an example vendor interface. The vendor interface depicted in FIG. 9 may be for a food vendor. This particular food vendor may be the Mexican restaurant called Los Altos Taqueria. The vendor interface may include a photo of the vendor, contact information of the vendor, an option to email or message the vendor, social networking interactions, such as like, follow, recommend, or save the vendor. The vendor interface may also include an average user rating, an indication of whether the vendor is currently open for business, and options to learn more about the vendor, such as to see a menu, more photos of the vendor and food provided by the vendor, or any other suitable information. Although not illustrated in FIG. 9, the vendor interface may also include an icon that says "start order" to begin ordering items from that vendor. Although this disclosure describes a particular vendor interface illustrated in a particular manner, this disclosure contemplates any suitable vendor interface illustrated in any suitable manner.

Figure 10:
FIG. 10 illustrates an example order delivery selection interface.

FIG. 10 illustrates an example order delivery selection interface. If the user selects an the icon to start a food order, the social-networking system may send instructions to display two or more food delivery options. As an example and not by way of limitation, a user may select a "start order" icon that is next to a reference to the Abundant Air Cafe. The social-networking system may send instructions to display an order delivery selection interface that includes two options through which the order may be delivered: Eaststreet, or Grubhub Food Delivery and Takeout. The user may select either one of these options to begin the food order selection process. Although this disclosure describes a particular order delivery selection interface illustrated in a particular manner, this disclosure contemplates any suitable order delivery selection interface illustrated in any suitable manner.

Figure 11:
FIG. 11 illustrates an example catalog order interface.
Figure 12:
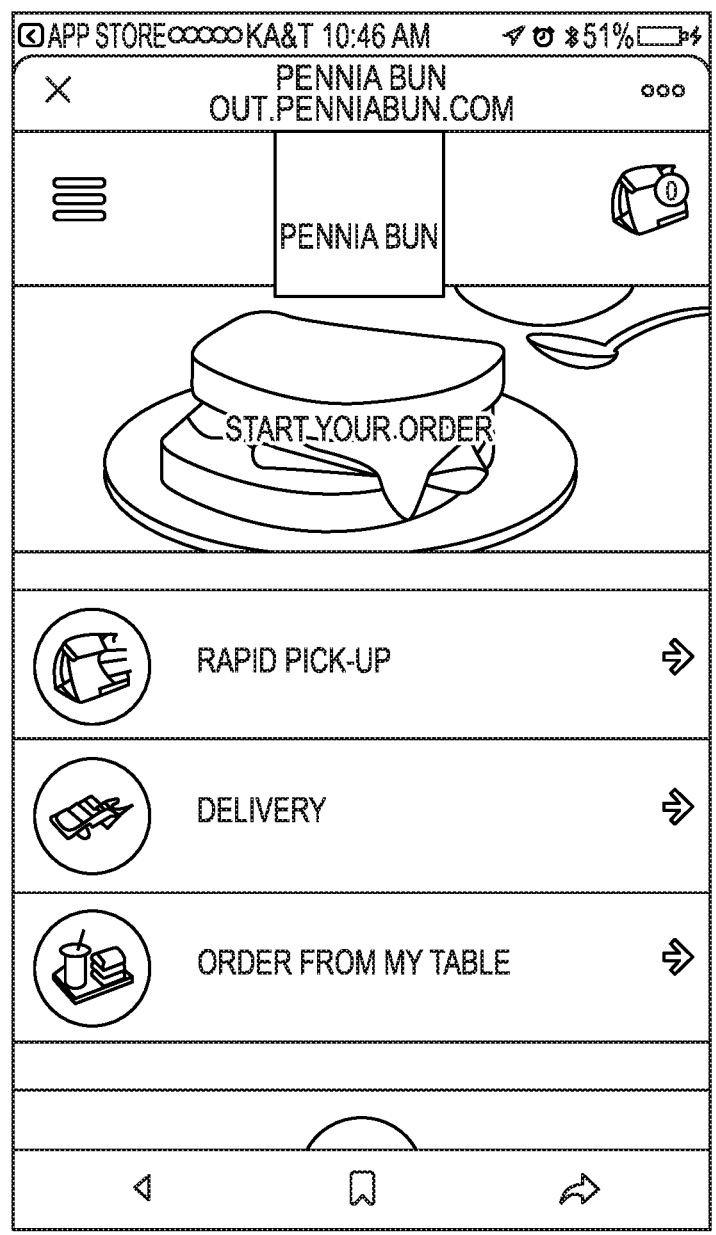
FIG. 12 illustrates an example catalog order interface.

FIGS. 11 and 12 illustrate an example catalog order interface. The catalog order interface depicted in FIG. 11 may be a food-order interface that is fulfilled by an order delivery system. The catalog order interface depicted in FIG. 12 may be a food-order interface that is fulfilled by the vendor itself. In this example, the vendor may maintain its own mobile food-order delivery interface. When a user selects to order food through such an interface, the social-networking system may send instructions to display the order interface through an I-frame in the application associated with the online social network. It may be from this interface that the user may place orders for catalog items. In this example interface, the catalog items may be food items. The food order interface may include menu items that may be ranked by popularity or may be ranked according to the methods discussed herein. The food order interface may also include past customer reviews that the user may view to help make a determination of whether the user should order food from the vendor. The menu items displayed in the food order interface may be customized for the user based on the user's social-networking data, as discussed herein. Although this disclosure describes a particular catalog order interface illustrated in a particular manner, this disclosure contemplates any suitable catalog order interface illustrated in any suitable manner.

In particular embodiments, the social-networking system may send order and delivery recommendations to a user based on the user's social-networking information and metadata items associated with catalog items from third-party vendors. As an example, a user may wish to order food through the online social network and have it delivered to her house. The user may input order parameters, such as her desired cost, her food preferences, her desired amount of wait time, or any other suitable parameter. Additionally or in the alternative, the social-networking system may access a social graph to determine the user's preferences. For example, the user may have liked three posts about Mexican food: a recipe for 7 layer bean dip, a post from a friend about her meal at a local taqueria, and a video about why corn tortillas are better than flour tortillas. From this, the social-networking system may estimate the user's affinity for Mexican food. The social-networking system may perform similar analyses for other food types, other restaurants, or any other suitable entity or concept on the online social network to generate a user-preference vector for the user. The social-networking system may also access metadata associated with catalog items from third-party vendors to generate catalog-item vectors for several different catalog items. The social-networking system may then identify or generate recommendations based on the similarity between the user-preference vector and the catalog-item vectors. The social-networking system may send the recommendations to the user's client system for display.

In particular embodiments, the social-networking system may receive order parameters from a client system of a user. The order parameters may include an identifier that identifies the user to the social-networking system and a location of the client system. The order parameters may also include one or more preferences of the user as specified by the user or as determined by the social-networking system based on information in the social graph. The order parameters may be determined by analyzing edge connections and affinity scores between the user node corresponding to the user and various catalog items. A catalog item may qualify as an order parameter if the affinity coefficient is above a threshold affinity coefficient. In particular embodiments, entire categories of catalog items may correspond to a concept node in the social graph. The social-networking system may analyze the affinity score between these concept nodes and the user node when determining the order parameters. As an example and not by way of limitation, a concept node corresponding to "Mexican Food" may exist in the social graph. There may be an edge connection between the user node corresponding to the user and the concept node corresponding to "Mexican Food." The edge connection may be associated with an affinity score that is above a threshold. Thus, "Mexican food" may become an order parameter for the user. Other order parameters may be other food types (e.g., Chinese, Thai, vegetarian, vegan, gluten free, paleo, organic, locally sourced), total cost, delivery time, average user rating, nutritional information, distance from user, or any other suitable parameter. These order parameters may be specified by the user or may be determined from information in the social graph, as explained herein.

In particular embodiments, the social-networking system may generate a user-preference vector for each user. The user-preference vector may have N dimensions. Each dimension may correspond to a preference of the user. As an example and not by way of limitation, a user-preference vector may have 17 dimensions, as shown by Table 2 below:

| Dimension Type | User Preference |
| --- | --- |
| Mexican | 1 |
| Fast Food | 1 |
| Chinese | 1 |
| Delis | 0 |
| Sandwiches | 0 |
| Pizza | 1 |
| Italian | 0 |
| Tex Mex | 0 |
| Thai | 0 |
| $ | 1 |
| $$ | 1 |
| $$$ | 0 |
| Delivery in under 60 minutes | 1 |
| Vegetarian | 0 |
| Paleo | 0 |
| Gluten-Free | 0 |
| Average user rating above 3.5 | 1 |

The user-preference vector may be regularly updated to track the changing preferences of the user. Updates to the user-preference vector may be based on updates to the social graph with regard to the user. The user-preference vector may be individualized for each user based on direct input from the user (e.g., the user specifies that she likes Mexican food, does not like deli food, etc.), or based on online social-networking activity of the user. As an example and not by way of limitation, a user may order food from a Chinese restaurant via the online social network. The user may rate the food with the app, or may post content to the online social network that says something positive about the food. For example, the user may post a photo of the food and say, "Just got take-out from Fortune Cookie, my favorite Chinese restaurant." This may inform the social-networking system that the user likes Chinese food. In particular embodiments, a positive post such as this may be enough for the social-networking system to determine that the user likes Chinese food and thus enter a "1" in that vector space. In particular embodiments, the social-networking system may create a node in the social graph that corresponds to each food type. When the user posts something positive about a particular food type, the social-networking system may generate an edge between that user's user node and the concept node corresponding to that food type. Each online social-networking interaction the user has with that food type may modify the affinity coefficient between that user's user node and the concept node corresponding to that food type. If the user has not had any interaction with a particular food type, the respective affinity coefficient may be zero. Once the affinity coefficient increases past a threshold affinity, the social-networking system may determine that the user likes that food type and thus may enter a "1" in the vector space for that food type. As an example and not by way of limitation, a user may initially have an affinity coefficient of zero for Tex Mex. The threshold affinity coefficient for the vector space to change from zero to one may be an affinity coefficient of 1.25. The user may place an order via the social networking system for food from a Tex Mex restaurant, may post a photo of the food, and may give a positive rating of the food. Using the formula be α=Ax+By+ . . . +Cz, where A, B, C represent particular actions the user has taken on the online social network with respect to a particular entity or concept, and x, y, z represent the weights associated with each action, the online social network may calculate an affinity coefficient between the user and Tex Mex food to be α=1(0.75)+1(0.5)+1(0.25)=1.5. This may be because in this example, ordering food of a particular type may receive a weighting of 0.75, posting a photo of the food to the online social network may receive a weighting of 0.50, and leaving a positive rating of the food may receive a weighting of 0.25. Since the calculated affinity coefficient in this example is greater than the threshold affinity coefficient in this example, the social-networking system may enter a "1" in the vector space for Tex Mex food. The social-networking system may perform similar calculations for each vector space in the user-preference vector.

In particular embodiments, the social-networking system may receive several references to catalog items from one or more third-party vendors. Each reference may be associated with metadata items. As an example and not by way of limitation, the references to catalog items may be menu items offered by several different restaurants. The third-party vendors may be the restaurants. The metadata items associated with each reference may contain information about the respective catalog item. The information may parallel the order parameters in one or more aspects, and include items such as cost, location, one or more types, average user rating, or any other suitable information. As an example and not by way of limitation, a catalog item for yellow curry from a restaurant called Spicy Thai may have the following metadata items: cost—$12.50; type1—Thai food; type2—vegetarian; and estimated delivery time—45 minutes; average user rating—3.7 out of 5. These metadata items may be accessed by the social-networking system. They may be stored on a server in association with the social-networking system or they may be sent by the third-party vendor to the social-networking system. The social-networking system may generate a catalog-item vector for each received reference. The catalog-item vector may be the same length as the user-preference vector, or it may be a different length. As an example and not by way of limitation, a catalog-item vector for the yellow curry in the above example may look like this:

| Dimension Type | Food Characteristic |
| --- | --- |
| Mexican | 0 |
| Fast Food | 0 |
| Chinese | 0 |
| Delis | 0 |
| Sandwiches | 0 |
| Pizza | 0 |
| Italian | 0 |
| Tex Mex | 0 |
| Thai | 1 |
| $ | 0 |
| $$ | 1 |
| $$$ | 0 |
| Delivery in under 60 minutes | 1 |
| Vegetarian | 1 |
| Paleo | 0 |
| Gluten-Free | 1 |
| Average user rating above 3.5 | 1 |

In particular embodiments, the social-networking system may calculate the distances between the user-preference vector of the user and each of several catalog-item vectors corresponding to the different catalog items offered by the different vendors. These distances (or differences) may be calculated using any suitable method, including Hamming distance, cosine similarity, or any other suitable method. As an example and not by way of limitation, the social-networking system may calculate these vector differences using the same processes that it uses to determine lookalike users, as discussed herein. Once the social-networking system has calculated differences, it may determine which catalog-item vectors are most similar to the user-preference vector for the user. Similar vectors may have a high cosine similarity or a low vector difference. The social-networking system may rank the references based on the similarity between their respective catalog-item vectors and the user-preference vector. The social-networking system may then generate recommendations for catalog items that correspond to the ranked references, and send the generated recommendations to a client system of the user in ranked order.

In particular embodiments, the above calculated vector similarities may be used to calculate a score for each reference. The scores for the references may be based at least in part on the order parameters, which may include the user-preference vector data as well as other parameters specified by the user such as cost preference, delivery time preference, or any other suitable parameter. The scores may also be based on the metadata items for each catalog item, as discussed above. The scores may also be based on promotional campaigns run by the third-party vendors. Although this disclosure describes scoring references in a particular manner, this disclosure contemplates scoring references in any suitable manner.

In particular embodiments, the social-networking system may send to the client system of the first user one or more references that has a score above a threshold score. This may be in the alternative to or in addition to sending references in ranked order. This may be because the user may not wish to see all the recommendations. In particular embodiments it may be preferable to send the user a limited number of references to limit the amount of data sent over the network or to reduce the amount of processing power required by the client system or to limit the burden on the user to decide between many enticing options. Although this disclosure describes sending recommendations to a client system in a particular manner, this disclosure contemplates sending recommendations to a client system in any suitable manner.

In particular embodiments, the one or more order parameters may also include a vendor preference. The vendor preference may be determined in a similar way that any of the other user preferences are determined (e.g., through direct user specification, or through social-networking information). As an example and not by way of limitation, a user may check in on the online social network several times at Chic-fil-A. This may increase an affinity coefficient between the user and Chic-fil-A. The affinity coefficient may surpass the threshold affinity coefficient. In response, the social-networking system may enter a "1" in the vector space that corresponds to Chic-Fil-A. In particular embodiments, the user-preference vector may gain additional vector spaces based on affinity coefficients between the user and various entities and concepts. As an example and not by way of limitation, in response to the affinity coefficient for Chic-fil-A surpassing the threshold, the social-networking system may generate a vector space that corresponds to Chic-fil-A as a food vendor and then enter a "1" in that vector space. In particular embodiments, the vendor preference may be determined by identifying an edge between the first node in the social graph and a second node corresponding to a particular vendor. Although this disclosure describes providing order parameters in a particular manner, this disclosure contemplates providing order parameters in any suitable manner.

In particular embodiments, each third-party vendor corresponds to a node in the social graph. Scoring each reference may be further based on a number of edge connections between the node corresponding to the respective third-party vendor and a plurality of users of the online social network. A higher number of edge connections may correspond to an increased score. This may be desirable because the number of edge connections to a node may be a signal of the popularity of the particular vendor corresponding to the node. A popular vendor may be more desirable for a user than an unpopular vendor. As an example and not by way of limitation, a user may prefer sushi. Two vendors may offer sushi: Neko Sushi, and Sushi Tenshi. Neko Sushi may correspond to a node in the social graph that has 15 edge connections. Sushi Tenshi may correspond to a node in the social graph that has 2,000 edge connections. As explained herein, an edge connection may be generated when a user performs an action on the online social network with regard to an entity or concept, such as checking-in with the entity, ordering food from the entity via an application associated with the online social network, following the entity, liking a post associated with the entity, or any other suitable action. Because the node for Sushi Tenshi has 2,000 edge connections, this may be an indicator that Sushi Tenshi is more popular and thus a better sushi provider than Neko Sushi, whose corresponding node only have 15 edge connections. Thus, a recommendation for sushi from Sushi Tenshi may be ranked higher than a recommendation for sushi from Neko Sushi, assuming all other metadata items (cost, delivery time, user rating) are relatively equal. Although this disclosure describes scoring a reference in a particular manner, this disclosure contemplates scoring a reference in any suitable manner.

Figure 13:
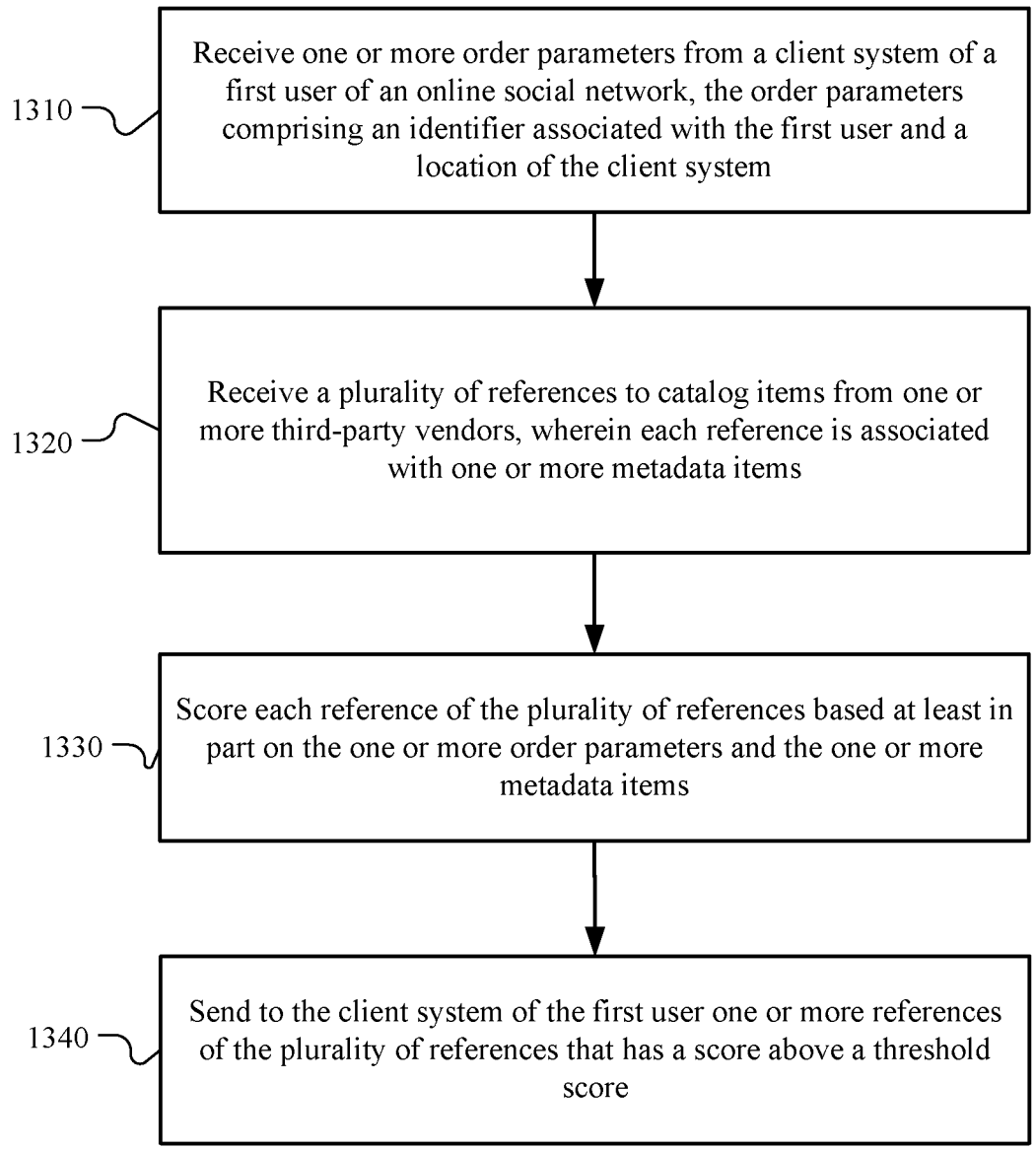
FIG. 13 illustrates an example method for recommending catalog items to a user of an online social network.

FIG. 13 illustrates an example method 1300 for recommending catalog items to a user of an online social network. The method may begin at step 1310, where the social-networking system may receive one or more order parameters from a client system of a first user of an online social network, the order parameters comprising an identifier associated with the first user and a location of the client system. At step 1320, the social-networking system may receive a plurality of references to catalog items from one or more third-party vendors, wherein each reference is associated with one or more metadata items. At step 1330, the social-networking system may score each reference of the plurality of references based at least in part on the one or more order parameters and the one or more metadata items. At step 1340, the social-networking system may send to the client system of the first user one or more references of the plurality of references that has a score above a threshold score. Particular embodiments may repeat one or more steps of the method of FIG. 13, where appropriate. Although this disclosure describes and illustrates particular steps of the method of FIG. 13 as occurring in a particular order, this disclosure contemplates any suitable steps of the method of FIG. 13 occurring in any suitable order. Moreover, although this disclosure describes and illustrates an example method for recommending catalog items to a user of an online social network including the particular steps of the method of FIG. 13, this disclosure contemplates any suitable method for recommending catalog items to a user of an online social network including any suitable steps, which may include all, some, or none of the steps of the method of FIG. 13, where appropriate. Furthermore, although this disclosure describes and illustrates particular components, devices, or systems carrying out particular steps of the method of FIG. 13, this disclosure contemplates any suitable combination of any suitable components, devices, or systems carrying out any suitable steps of the method of FIG. 13.

In particular embodiments, the social-networking system may access the social graph to determine if a first user has interacted with a content object posted by a second user of the online social network. The content object may be associated with an entity of the online social network. The entity may be a vendor, and the content object may be related to a catalog item offered by the vendor. The social-networking system may receive an indication that the first user has interacted with the content object in order to make a recommendation to the first user. As an example and not by way of limitation, consider the following scenario. The second user may have visited an entity that may be Mexican Restaurant. The second user may have ordered a super burrito and posted a photo of his meal to the online social network. The first user may have viewed the second user's post and may have "liked" the post or commented on the post with text that says "Looks good!" In response to this interaction, the social-networking system may update the user-preference vector associated with the first user as well as adjust the affinity coefficient between the user node corresponding to the first user and the node corresponding to Mexican Restaurant. In particular embodiments, other affinity coefficients may be modified as well. In this example, those affinity coefficients that are adjusted may include the user's affinity coefficient for burritos, for Mexican food, or for any other suitable entity.

In particular embodiments, the social-networking system may access user data associated with the first user and entity data associated with the entity. The user data may be the information included in the social graph that is discussed herein. The user node associated with the first user may be connected to other nodes. The user data may include an indication that the first user has interacted with a recently posted content object associated with the entity. Continuing with the above example, the social-networking system may determine that the first user has interacted with the content object associated with Mexican Restaurant. The entity data may include catalog items associated with the entity. As an example and not by way of limitation, the catalog items may be menu items from Mexican Restaurant that includes a burrito, enchiladas, nachos, tacos, and a quesadilla. The entity data may also include information related to offers the entity may be willing to make to potential customers, such as free drinks, half-off appetizers, two-for-one deals, or any other suitable offer. In particular embodiments, the entity data may also include an average user rating of the entity.

In particular embodiments, the entity data may also include a number of users of the online social network who have posted or interacted with content objects on the online social network that are related to the entity. The number of users of the online social network who have posted or interacted with content objects on the online social network that are related to the entity may be represented by several edges in a social graph that connect to a node that corresponds to the entity. A higher number of edge connections may correspond to an increased score. This may be desirable because the number of edge connections to a node may be a signal of the popularity of the particular vendor corresponding to the node. A popular vendor may be more desirable for a user than an unpopular vendor. As an example and not by way of limitation, a user may prefer sushi. Two vendors may offer sushi: Neko Sushi, and Sushi Tenshi. Neko Sushi may correspond to a node in the social graph that has 15 edge connections. Sushi Tenshi may correspond to a node in the social graph that has 2,000 edge connections. As explained herein, an edge connection may be generated when a user performs an action on the online social network with regard to an entity or concept, such as checking-in with the entity, ordering food from the entity via an application associated with the online social network, following the entity, liking a post associated with the entity, or any other suitable action. Because the node for Sushi Tenshi has 2,000 edge connections, this may be an indicator that Sushi Tenshi is more popular and thus a better sushi provider than Neko Sushi, whose corresponding node only have 15 edge connections. Thus, a recommendation for sushi from Sushi Tenshi may be ranked higher than a recommendation for sushi from Neko Sushi, assuming all other metadata items (cost, delivery time, user rating) are relatively equal. Although this disclosure describes scoring a reference in a particular manner, this disclosure contemplates scoring a reference in any suitable manner.

In particular embodiments, when the social-networking system receives the indication that the first user has interacted with the content object posted by the second user, where the content object is related to the entity, the social-networking system may identify one or more prompts. The identification of the one or more prompts may be based at least in part on the user data and the entity data. The one or more prompts may be invitations for the first user to take some action with regard to the entity, such as to purchase items from the entity. As an example and not by way of limitation, the prompt may be a notification that says, "Kevin, your friend Bree just had ramen at Orenchi. Make a reservation for this weekend." Thus, the prompt may be an invitation to make a reservation at the entity Orenchi. Although this disclosure describes identifying particular prompts in a particular manner, this disclosure contemplates identifying any suitable prompts in any suitable manner.

Figure 14:
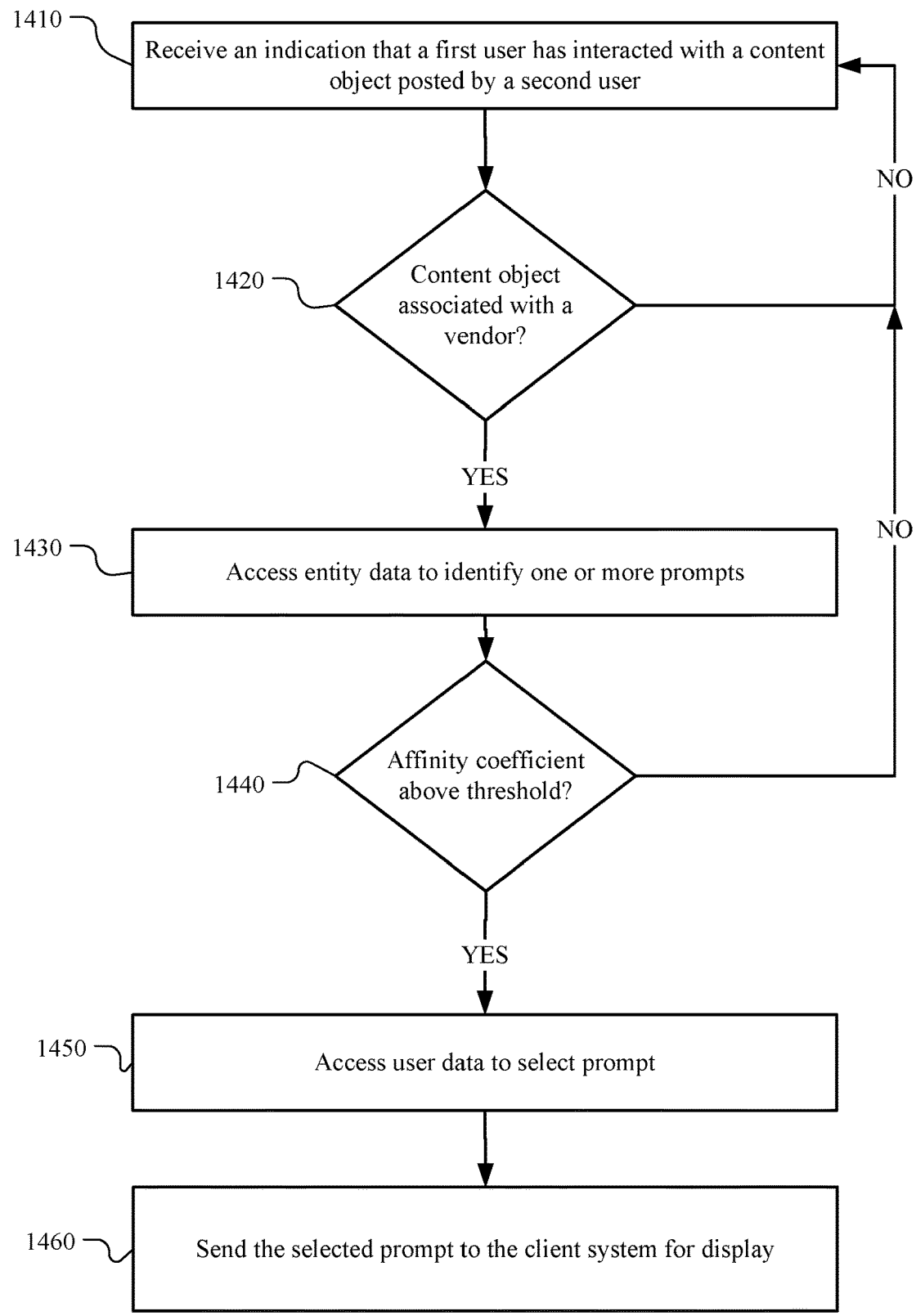
FIG. 14 illustrates an example method for determining to send a selected prompt to a user of the online social network.

FIG. 14 illustrates an example method 1400 for determining to send a selected prompt to a user of the online social network. At step 1410, the social-networking system may receive an indication that a first user has interacted with a content object posted by a second user. As discussed herein, the content object may be any suitable object, such as a status update, a photo, a video, a check-in, or any other suitable content. As an example and not by way of limitation, a user Bree may post a photo to the online social network of her recent meal at Orenchi Ramen. He may include a caption to her photo that says: "the thickest Ramen noodles!" Bree may also tag Orenchi Ramen (which may be an entity on the online social network), or use a geotag which identifies Orenchi as the location at which the photo was taken. The social-networking system may receive an indication that Bree has posted this content object. At step 1420, the social-networking system may determine that the content object is associated with a vendor. The content object may be associated with an entity automatically, because the user who posted the content object may be an entity. But the content object may be associated with one or more other entities, such as places, businesses, or organizations. The social-networking system may determine that the content object is associated with an entity by any suitable indicator, including tags, geotags, or context. Sometimes the entity may also be a vendor. The vendor may offer products or services to the public, and may wish to advertise via the online social network. If the content object is associated with a vendor that is advertising using the methods discussed herein, the social-networking system may proceed to step 1430, where the social-networking system may access entity data to identify one or more prompts. The entity data may include prompts as well as other entity data such as approximate wait times, busy times, slow times, special promotionals, menu items offered by the vendor, or any other suitable information.

At step 1440, the social networking system may determine if an affinity coefficient between the first user and the vendor is above a threshold coefficient. In particular embodiments, any interaction performed by the user with regard to the vendor may raise the affinity coefficient above the threshold. In particular embodiments, the threshold may be zero, such that so long as the user has not had any negative interactions with the vendor on the online social network (e.g., such as a "mad face" reaction with regard to the vendor), the affinity coefficient may exceed the threshold. At step 1450, the social-networking system may access user data. The user data may be contained in a user-preference vector as discussed herein. The user data may be used to select one of the identified prompts. The method of selection may be to create a prompt vector tor for each of the prompts and calculate the difference between each of the prompt vectors and the user-preference vector. Then the social-networking system may select the most similar prompt vector to send to the user. This process may be similar to the process for selecting menu item recommendations as explained herein or similar to the process for identifying lookalike users, as explained herein. At step 1460, the social-networking system may send the selected prompt to the client system of the first user for display.

Particular embodiments may repeat one or more steps of the method of FIG. 14, where appropriate. Although this disclosure describes and illustrates particular steps of the method of FIG. 14 as occurring in a particular order, this disclosure contemplates any suitable steps of the method of FIG. 14 occurring in any suitable order. Moreover, although this disclosure describes and illustrates an example method for determining to send a selected prompt to a user of the online social network including the particular steps of the method of FIG. 14, this disclosure contemplates any suitable method for determining to send a selected prompt to a user of the online social network including any suitable steps, which may include all, some, or none of the steps of the method of FIG. 14, where appropriate. Furthermore, although this disclosure describes and illustrates particular components, devices, or systems carrying out particular steps of the method of FIG. 14, this disclosure contemplates any suitable combination of any suitable components, devices, or systems carrying out any suitable steps of the method of FIG. 14.

Figure 15:
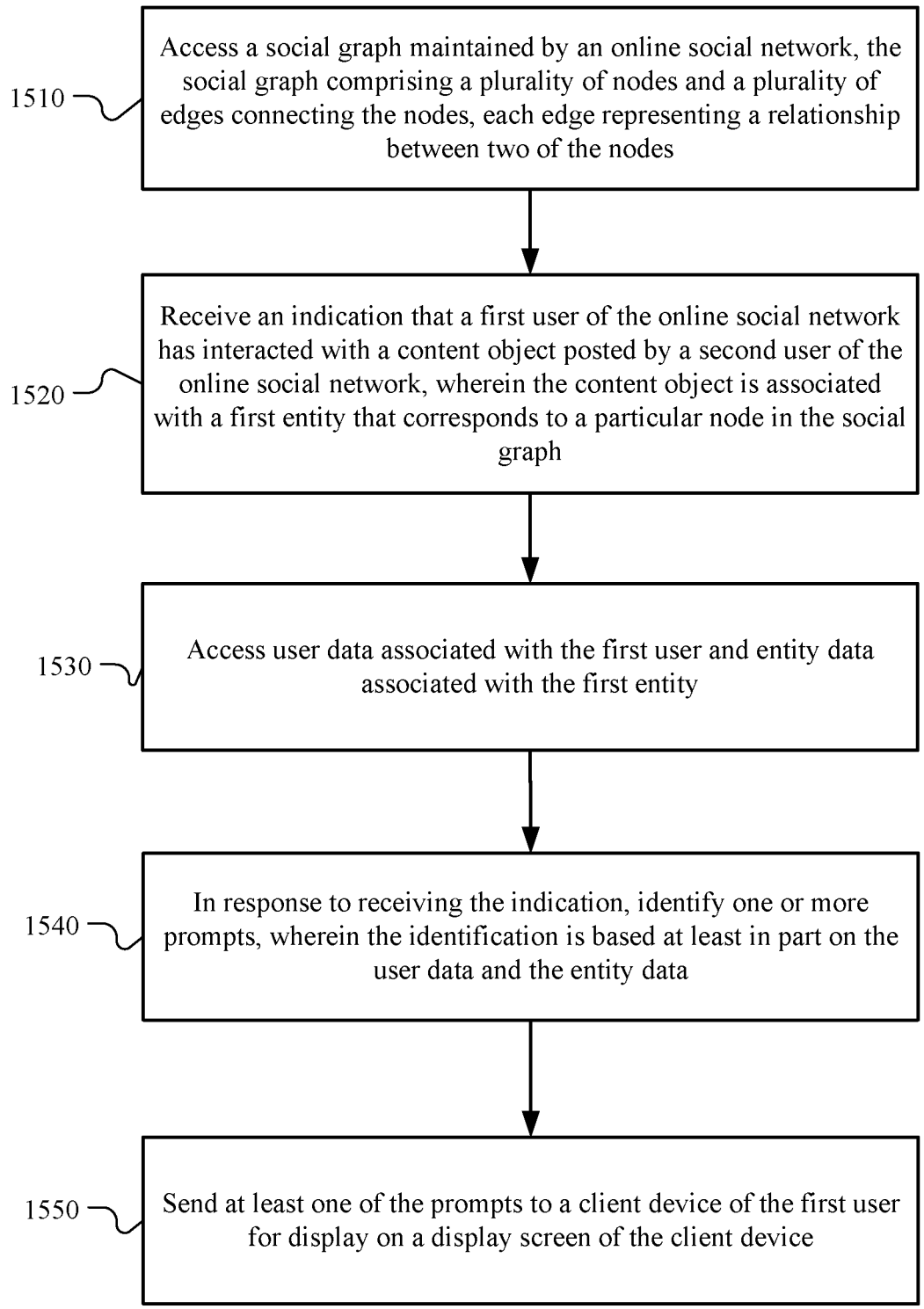
FIG. 15 illustrates an example method for sending prompts to invite a user to perform an action with regard to an entity.

FIG. 15 illustrates an example method 1500 for sending prompts to invite a user to perform an action with regard to an entity. The method may begin at step 1510, where the social-networking system may access a social graph maintained by an online social network, the social graph comprising a plurality of nodes and a plurality of edges connecting the nodes, each edge representing a relationship between two of the nodes. At step 1520, the social networking system may receive an indication that a first user of the online social network has interacted with a content object posted by a second user of the online social network, wherein the content object is associated with a first entity that corresponds to a particular node in the social graph. At step 1530, the social-networking system may access user data associated with the first user and entity data associated with the first entity. At step 1540, the social networking system may, in response to receiving the indication, identify one or more prompts, wherein the identification is based at least in part on the user data and the entity data. At step 1550, the social-networking system may send at least one of the prompts to a client device of the first user for display on a display screen of the client device. Particular embodiments may repeat one or more steps of the method of FIG. 15, where appropriate. Although this disclosure describes and illustrates particular steps of the method of FIG. 15 as occurring in a particular order, this disclosure contemplates any suitable steps of the method of FIG. 15 occurring in any suitable order. Moreover, although this disclosure describes and illustrates an example method for sending prompts to invite a user to perform an action with regard to an entity including the particular steps of the method of FIG. 15, this disclosure contemplates any suitable method for sending prompts to invite a user to perform an action with regard to an entity including any suitable steps, which may include all, some, or none of the steps of the method of FIG. 15, where appropriate. Furthermore, although this disclosure describes and illustrates particular components, devices, or systems carrying out particular steps of the method of FIG. 15, this disclosure contemplates any suitable combination of any suitable components, devices, or systems carrying out any suitable steps of the method of FIG. 15.

In particular embodiments, the social-networking system may generate recommendations based on an event object. A user of the online social network may create an event object for an event. Planning for an event may be challenging because each attendee may have different food preferences and different expectations. The social-networking system may help the event creator to order the right type of food that will appeal to as many people as possible. As an example and not by way of limitation, the event may be a baby shower for a user named Jessica. The creator of the event may be a user named Stephany. Stephany may generate the event object by making the appropriate selections in an event creation interface of the online social network. Stephany may invite several other people to the event and designate the location of the event to be at a nearby park on Saturday, October 21 at 3:00 PM. Each of the invitees may be users of the online social network as well. The social-networking system may access these users' social-networking data to identify or generate recommendations for the event creator, Stephany. The recommendations may include food recommendations, catering recommendations, music recommendations, rescheduling recommendations, game recommendations, a recommended seating chart, or any other suitable recommendation. This may help Stephany plan the event and may save resources by requiring fewer calculations and queries to search engines.

In particular embodiments, the social-networking system may receive an indication that a user of an online social network has created an event object for an event. The social-networking system may receive this indication when the user generates the event object. The event object may be generated when invitations are sent to the invitees over the online social network, or at a previous point in time, such as when the invitees are selected. The event object may comprise a plurality of event parameters. The event parameters may include a date for the event, a time of the event, a location of the event, a name of the event, and one or more names of invitees to the event. Although this disclosure describes receiving an indication of an event in a particular manner, this disclosure contemplates receiving an indication of an event in any suitable manner.

In particular embodiments, the social-networking system may access the social graph maintained by the social-networking system. The social-networking system may access data associated with each invitee. The data associated with each invitee may be the user node corresponding to that user as well as edge connections between the respective user node and several other nodes that correspond to various entities and objects, such as songs the user has liked or has listened to, restaurants the user has checked-in at, liked, or posted content about, or any other suitable information. As an example and not by way of limitation, there may be 50 invitees to Jessica's baby shower. Each of these users may have a corresponding user node in the social graph. In particular embodiments, each invitee may correspond to a user node, and each of one or more food types corresponds to a concept node. The social-networking system may identify one or more edges between one or more user nodes corresponding to the invitees and one or more concept nodes corresponding to the one or more food types. In particular embodiments, the social-networking system may make recommendations based off these identifications.

In particular embodiments, from the information contained in the social graph, the social-networking system may generate a user-preference vector for each of the invitees. Alternatively, the user-preference vector may have already been created for each of the invitees. In this case, the social-networking system may only need to access the user-preference vectors.

The user-preference vector may have N dimensions. Each dimension may correspond to a preference of the user. As an example and not by way of limitation, an invitee to Jessica's baby shower may have a user-preference vector with 16 dimensions, as shown in the following table:

| Dimension Type | User Preference |
|---|---|
| Mexican | 1 |
| Fast Food | 1 |
| Chinese | 1 |
| Delis | 0 |
| Sandwiches | 0 |
| Pizza | 1 |
| Italian | 0 |
| Tex Mex | 0 |
| Thai | 0 |
| $ | 1 |
| $$ | 1 |
| $$$ | 0 |
| Vegan | 0 |
| Vegetarian | 1 |
| Paleo | 0 |
| Gluten-Free | 0 |

The user-preference vector may be regularly updated to track the changing preferences of the user. Updates to the user-preference vector may be based on updates to the social graph with regard to the user. The user-preference vector may be individualized for each user based on direct input from the user (e.g., the user specifies that she likes Mexican food, does not like deli food, etc.), or based on online social-networking activity of the user. As an example and not by way of limitation, a user may order food from a Chinese restaurant via the online social network. The user may rate the food with the app, or may post content to the online social network that says something positive about the food. For example, the user may post a photo of the food and say, "Just got take-out from Fortune Cookie, my favorite Chinese restaurant." This may inform the social-networking system that the user likes Chinese food. In particular embodiments, a positive post such as this may be enough for the social-networking system to determine that the user likes Chinese food and thus enter a "1" in that vector space. In particular embodiments, the social-networking system may create a node in the social graph that corresponds to each food type. When the user posts something positive about a particular food type, the social-networking system may generate an edge between that user's user node and the concept node corresponding to that food type. Each online social-networking interaction the user has with that food type may modify the affinity coefficient between that user's user node and the concept node corresponding to that food type. If the user has not had any interaction with a particular food type, the respective affinity coefficient may be zero. Once the affinity coefficient increases past a threshold affinity, the social-networking system may determine that the user likes that food type and thus may enter a "1" in the vector space for that food type. As an example and not by way of limitation, a user may initially have an affinity coefficient of zero for Tex Mex. The threshold affinity coefficient for the vector space to change from zero to one may be an affinity coefficient of 1.25. The user may place an order via the social networking system for food from a Tex Mex restaurant, may post a photo of the food, and may give a positive rating of the food. Using the formula be $\alpha = Ax + By + \ldots + Cz$, where A, B, C represent particular actions the user has taken on the online social network with respect to a particular entity or concept, and x, y, ... z represent the weights associated with each action, the online social network may calculate an affinity coefficient between the user and Tex Mex food to be $\alpha = 1(0.75) + 1(0.5) + 1(0.25) = 1.5$. This may be because in this example, ordering food of a particular type may receive a weighting of 0.75, posting a photo of the food to the online social network may receive a weighting of 0.50, and leaving a positive rating of the food may receive a weighting of 0.25. Since the calculated affinity coefficient in this example is greater than the threshold affinity coefficient in this example, the social-networking system may enter a "1" in the vector space for Tex Mex food. The social-networking system may perform similar calculations for each vector space in the user-preference vector.

Each user's user-preference vector may be different because each person may have unique tastes and preferences. In particular embodiments, the social-networking system may make recommendations based on the user-preference vectors of at least some of the invitees to an event. The idea behind this may be to recommend food for the event that would appeal to as many people as possible. To do this, the social-networking system may perform one or more analyses on the user-vectors for the invitees. In particular embodiments and to save processing power, the social-networking system may base its recommendations on those invitees who have indicated an intent to attend the event. In particular embodiments, each invitee may receive a weight that may indicate how much of an influence his or her preferences may have on the recommendations. In particular embodiments, an invitee who has indicated an intent to attend the event may be assigned a heavier weight than an invitee who has not indicated an intent to attend the event. This may be because the invitee who has not indicated an intent to attend the event may not attend the event at all, and thus his preferences may not matter at all.

The analyses that the social-networking system may perform include determining an average user-preference vector for all the invitees, determining the most popular vector elements by summing across all user-preference vectors, or by doing any other suitable analysis. The social-networking system may attempt to create a single user-preference vector that represents the user-preference vectors of at least some of the invitees. As an example and not by way of limitation, consider the following user-preference vectors for the example invitees.

| | Mexican | Thai | Sushi | Pizza | Italian | Burgers | Vegan | Vegetarian | GF |
|---|---|---|---|---|---|---|---|---|---|
| Jessica | 1 | 0 | 0 | 1 | 0 | 0 | 0 | 1 | 0 |
| Steph | 0 | 0 | 0 | 1 | 0 | 1 | 0 | 0 | 0 |
| Jenny | 0 | 0 | 1 | 1 | 0 | 0 | 1 | 0 | 0 |
| Ruth | 1 | 1 | 0 | 0 | 0 | 0 | 0 | 0 | 0 |
| Carol | 1 | 1 | 0 | 0 | 1 | 0 | 0 | 1 | 1 |
| Lynne | 0 | 1 | 0 | 1 | 1 | 0 | 0 | 0 | 0 |
| Kate | 0 | 1 | 0 | 1 | 0 | 1 | 0 | 0 | 1 |
| Total | 3 | 4 | 1 | 5 | 2 | 2 | 1 | 2 | 2 |
| Average | .42 | .57 | .14 | .71 | .29 | .29 | .14 | .29 | .29 |
| Rounded Average | 0 | 1 | 0 | 1 | 0 | 0 | 0 | 0 | 0 |

Each column may represent a vector space and each row may represent a user-preference vector. As can be seen by the above table, summing the vector spaces over all invitees may lead to a slightly different outcome than calculating the average preference for each vector space and then rounding to the nearest whole number. By summing, it is clear to see that pizza is the most popular option, so if the social-networking system uses this method it may determine that pizza is the best option. However, if the social-networking system uses the averages and then rounds to the nearest whole number, Thai food or pizza may be appropriate food options for the event. In particular embodiments, the social-networking system may take individual user preferences into account. For example if a minority of people are vegetarian, vegan, or gluten-free (GF), it may be desirable to offer at least some vegetarian, vegan, and/or gluten free options. Thus, the social-networking system may make recommendations based on this information.

In particular embodiments, the social-networking system may access a database associated with one or more third-party food-service providers, the database comprising a plurality of food-service parameters associated with the food-service providers. These food-service parameters may include things like cost, average user rating, food-type, the size of a party that the food-service provider can handle, a geographical distance between the food-service provider and a location associated with the event, or any other suitable food-service parameter. The social-networking system may generate a food-service provider vector for each of the food-service providers. The food-service provider vector may be the same length as the user-preference vector, or it may be a different length. As an example and not by way of limitation, a food-service provider vector for an example food-service provider may look like this:

| Dimension Type | Caterer Characteristic |
| --- | --- |
| Mexican | 0 |
| Fast Food | 0 |
| Chinese | 0 |
| Delis | 0 |
| Sandwiches | 0 |
| Pizza | 0 |
| Italian | 0 |
| Tex Mex | 0 |
| Thai | 1 |
| $ | 0 |
| $$ | 1 |
| $$$ | 0 |
| Can service parties of 50 | 1 |
| Vegetarian | 1 |
| Paleo | 0 |
| Gluten-Free | 1 |
| Average user rating above 3.5 | 1 |

In particular embodiments, the social-networking system may calculate the distances between the calculated averaged or summed user-preference vector of the users and each of several food-service provider vectors corresponding to the different food-service providers. These distances (or differences) may be calculated using any suitable method, including Hamming distance, cosine similarity, or any other suitable method. As an example and not by way of limitation, the social-networking system may calculate these vector differences using the same processes that it uses to determine lookalike users, as discussed herein. Once the social-networking system has calculated differences, it may determine which food-service provider may be the most similar to the user-preference vectors for the invitees. Similar vectors may have a high cosine similarity or a low vector difference. The social-networking system may rank the food-service providers based on the similarity between their respective food-service provider vectors and the user-preference vectors. The social-networking system may then generate recommendations for food-service providers that correspond to the ranked references, and send the generated recommendations to a client system of the user in ranked order.

In particular embodiments, the above calculated vector similarities may be used to calculate a score for each food-service provider. The scores for the references may be based at least in part on the event parameters, which may include the user-preference vector data as well as other parameters specified by the event creator such as cost preference, delivery time preference, or any other suitable parameter. The scores may also be based on the vector space information of individual invitees. As an example and not by way of limitation, if at least one invitee is a vegetarian (as determined by her user-preference vector or other social-networking data), the social-networking system may increase a score for a food-service provider that offers a vegetarian option. The scores may also be based on promotional campaigns run by the food-service providers. Although this disclosure describes scoring references in a particular manner, this disclosure contemplates scoring references in any suitable manner.

In particular embodiments, the social-networking system may generate one or more food-service recommendations for the event, wherein the food-service recommendations are generated based on (1) at least some of the plurality of event parameters, (2) at least some of the plurality of nodes and the plurality of edges connecting the nodes in the social graph, and (3) at least some of the plurality of food-service parameters. The recommendation may be based on the user-preference vectors and the food-service provider vectors, as discussed herein. In particular embodiments, the social-networking system may send the food-service recommendations in ranked order to the a client system associated with the user of the online social network.

In particular embodiments, the social-networking system may generate a seating chart for an event. Consider that a wedding usually brings many people from both sides of the marriage to the event. Lots of people may not know each other. It may be desirable for friends to sit next to each other at the same table. The social-networking system may be well-equipped to determine which guests would like to sit next to each other, and which guests probably should not be seated at the same table. In particular embodiments, the seating chart may be generated based on a degree of separation in the social graph between user nodes corresponding to the plurality of invitees. As an example and not by way of limitation, two wedding guests, Michael and Samantha, may be friends on the online social network. Thus, they may have a first-degree connection. A third user, Jacob, may be friends with Samantha, but not with Michael. Thus, Michael and Jacob may have a second-degree connection. Depending on the number of guests and the seating capacity, the social networking system may determine to seat Michael, Jacob, and Samantha at the same table, since they all have at least a two-degree separation. The social-networking system may take different factors into consideration when creating the seating chart, such as similar interests, backgrounds, education, or any other suitable factor. Although this disclosure describes creating a seating chart in a particular manner, this disclosure contemplates creating a seating chart in any suitable manner.

Figure 16:
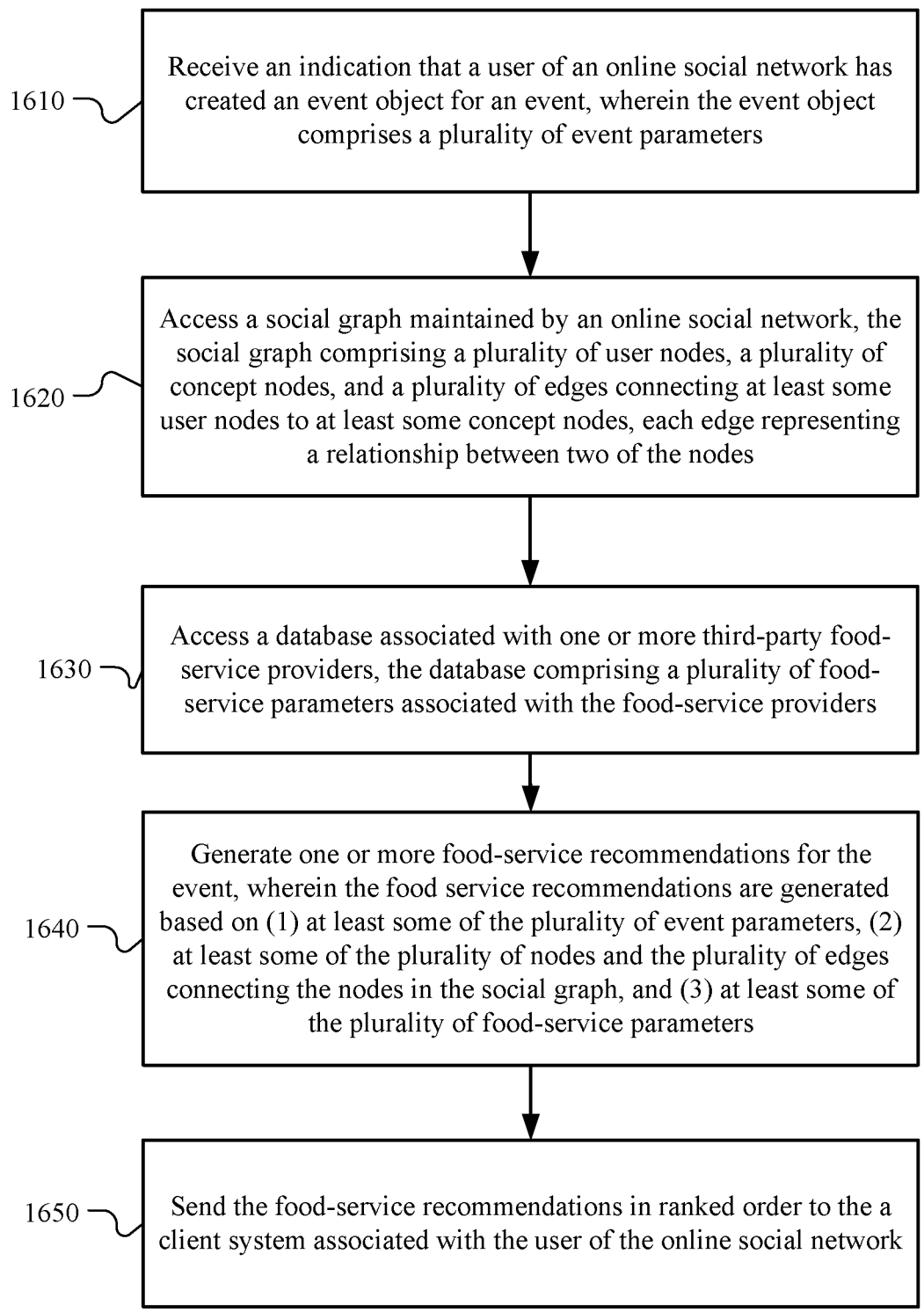
FIG. 16 illustrates an example method for sending recommendations for one or more food-service providers to a client system of a user of an online social network

FIG. 16 illustrates an example method 1600 for sending recommendations for one or more food-service providers to a client system of a user of an online social network. The method may begin at step 1610, where the social-networking system may receive an indication that a user of an online social network has created an event object for an event, wherein the event object comprises a plurality of event parameters. At step 1620, the social networking system may access a social graph maintained by an online social network, the social graph comprising a plurality of user nodes, a plurality of concept nodes, and a plurality of edges connecting at least some user nodes to at least some concept nodes, each edge representing a relationship between two of the nodes. At step 1630, the social-networking system may access a database associated with one or more third-party food-service providers, the database comprising a plurality of food-service parameters associated with the food-service providers. At step 1640, the social networking system may generate one or more food-service recommendations for the event, wherein the food service recommendations are generated based on (1) at least some of the plurality of event parameters, (2) at least some of the plurality of nodes and the plurality of edges connecting the nodes in the social graph, and (3) at least some of the plurality of food-service parameters. At step 1650, the social-networking system may send the food-service recommendations in ranked order to the a client system associated with the user of the online social network. Particular embodiments may repeat one or more steps of the method of FIG. 16, where appropriate. Although this disclosure describes and illustrates particular steps of the method of FIG. 16 as occurring in a particular order, this disclosure contemplates any suitable steps of the method of FIG. 16 occurring in any suitable order. Moreover, although this disclosure describes and illustrates an example method for sending recommendations for one or more food-service providers to a client system of a user of an online social network including the particular steps of the method of FIG. 16, this disclosure contemplates any suitable method for sending recommendations for one or more food-service providers to a client system of a user of an online social network including any suitable steps, which may include all, some, or none of the steps of the method of FIG. 16, where appropriate. Furthermore, although this disclosure describes and illustrates particular components, devices, or systems carrying out particular steps of the method of FIG. 16, this disclosure contemplates any suitable combination of any suitable components, devices, or systems carrying out any suitable steps of the method of FIG. 16.

Figure 17:
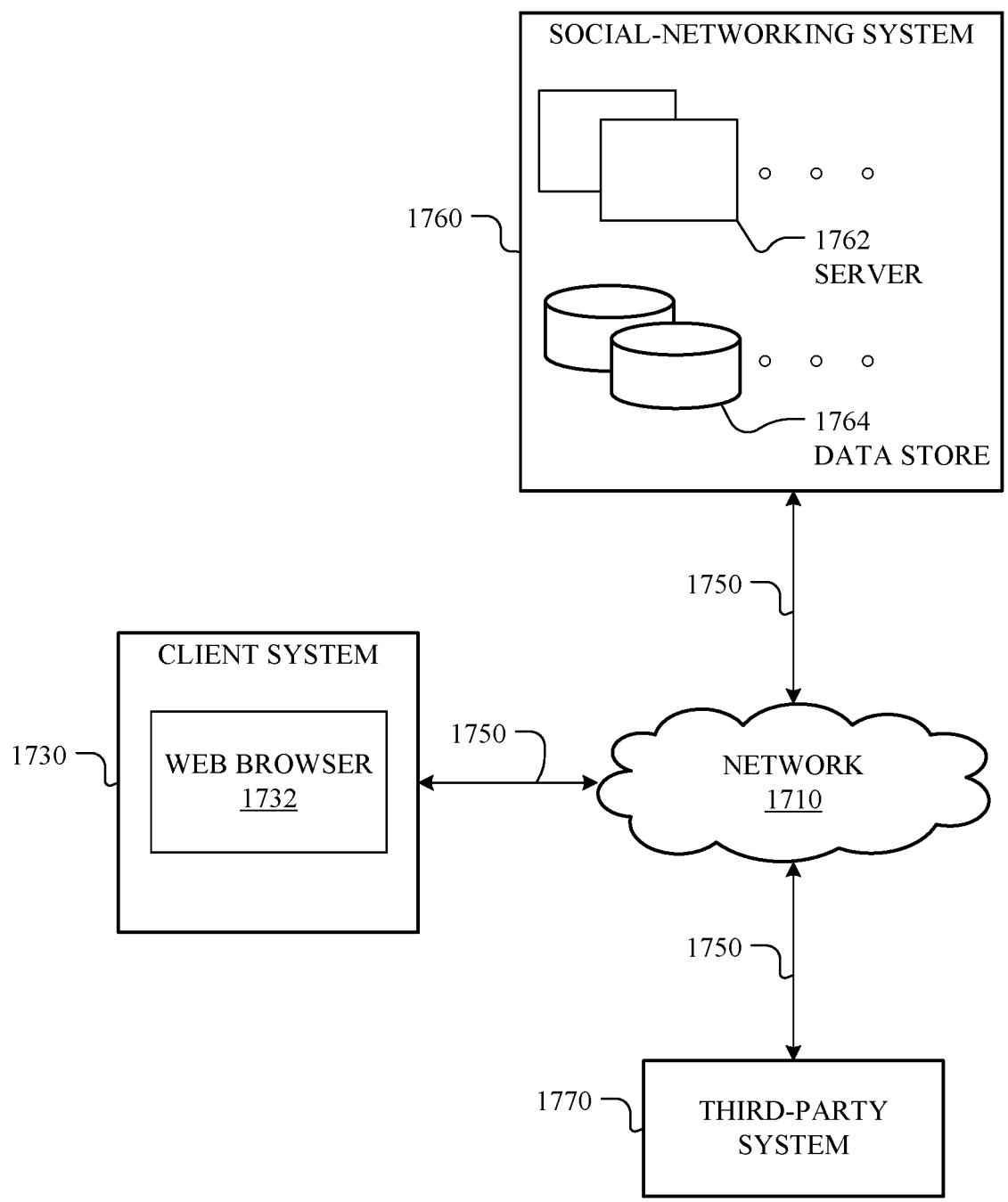
FIG. 17 illustrates an example network environment associated with a social-networking system.

FIG. 17 illustrates an example network environment 1700 associated with a social-networking system. Network environment 1700 includes a client system 1730, a social-networking system 1760, and a third-party system 1770 connected to each other by a network 1710. Although FIG. 17 illustrates a particular arrangement of client system 1730, social-networking system 1760, third-party system 1770, and network 1710, this disclosure contemplates any suitable arrangement of client system 1730, social-networking system 1760, third-party system 1770, and network 1710. As an example and not by way of limitation, two or more of client system 1730, social-networking system 1760, and third-party system 1770 may be connected to each other directly, bypassing network 1710. As another example, two or more of client system 1730, social-networking system 1760, and third-party system 1770 may be physically or logically co-located with each other in whole or in part. Moreover, although FIG. 17 illustrates a particular number of client systems 1730, social-networking systems 1760, third-party systems 1770, and networks 1710, this disclosure contemplates any suitable number of client systems 1730, social-networking systems 1760, third-party systems 1770, and networks 1710. As an example and not by way of limitation, network environment 1700 may include multiple client system 1730, social-networking systems 1760, third-party systems 1770, and networks 1710.

This disclosure contemplates any suitable network 1710. As an example and not by way of limitation, one or more portions of network 1710 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1710 may include one or more networks 1710.

Links 1750 may connect client system 1730, social-networking system 1760, and third-party system 1770 to communication network 1710 or to each other. This disclosure contemplates any suitable links 1750. In particular embodiments, one or more links 1750 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 1750 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 1750, or a combination of two or more such links 1750. Links 1750 need not necessarily be the same throughout network environment 1700. One or more first links 1750 may differ in one or more respects from one or more second links 1750.

In particular embodiments, client system 1730 may be an electronic device including hardware, software, or embedded logic components or a combination of two or more such components and capable of carrying out the appropriate functionalities implemented or supported by client system 1730. As an example and not by way of limitation, a client system 1730 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 1730. A client system 1730 may enable a network user at client system 1730 to access network 1710. A client system 1730 may enable its user to communicate with other users at other client systems 1730.

In particular embodiments, client system 1730 may include a web browser 1732 and may have one or more add-ons, plug-ins, or other extensions. A user at client system 1730 may enter a Uniform Resource Locator (URL) or other address directing the web browser 1732 to a particular server (such as server 1762, or a server associated with a third-party system 1770), and the web browser 1732 may generate a Hyper Text Transfer Protocol (HTTP) request and communicate the HTTP request to server. The server may accept the HTTP request and communicate to client system 1730 one or more Hyper Text Markup Language (HTML) files responsive to the HTTP request. Client system 1730 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts, combinations of markup language and scripts, and the like. Herein, reference to a webpage encompasses one or more corresponding webpage files (which a browser may use to render the webpage) and vice versa, where appropriate.

In particular embodiments, social-networking system 1760 may be a network-addressable computing system that can host an online social network. Social-networking system 1760 may generate, store, receive, and send social-networking data, such as, for example, user-profile data, concept-profile data, social-graph information, or other suitable data related to the online social network. Social-networking system 1760 may be accessed by the other components of network environment 1700 either directly or via network 1710. As an example and not by way of limitation, client system 1730 may access social-networking system 1760 using a web browser 1732, or a native application associated with social-networking system 1760 (e.g., a mobile social-networking application, a messaging application, another suitable application, or any combination thereof) either directly or via network 1710. In particular embodiments, social-networking system 1760 may include one or more servers 1762. Each server 1762 may be a unitary server or a distributed server spanning multiple computers or multiple datacenters. Servers 1762 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 1762 may include hardware, software, or embedded logic components or a combination of two or more such components for carrying out the appropriate functionalities implemented or supported by server 1762. In particular embodiments, social-networking system 1760 may include one or more data stores 1764. Data stores 1764 may be used to store various types of information. In particular embodiments, the information stored in data stores 1764 may be organized according to specific data structures. In particular embodiments, each data store 1764 may be a relational, columnar, correlation, or other suitable database. Although this disclosure describes or illustrates particular types of databases, this disclosure contemplates any suitable types of databases. Particular embodiments may provide interfaces that enable a client system 1730, a social-networking system 1760, or a third-party system 1770 to manage, retrieve, modify, add, or delete, the information stored in data store 1764.

In particular embodiments, social-networking system 1760 may store one or more social graphs in one or more data stores 1764. In particular embodiments, a social graph may include multiple nodes—which may include multiple user nodes (each corresponding to a particular user) or multiple concept nodes (each corresponding to a particular concept)—and multiple edges connecting the nodes. Social-networking system 1760 may provide users of the online social network the ability to communicate and interact with other users. In particular embodiments, users may join the online social network via social-networking system 1760 and then add connections (e.g., relationships) to a number of other users of social-networking system 1760 to whom they want to be connected. Herein, the term "friend" may refer to any other user of social-networking system 1760 with whom a user has formed a connection, association, or relationship via social-networking system 1760.

In particular embodiments, social-networking system 1760 may provide users with the ability to take actions on various types of items or objects, supported by social-networking system 1760. As an example and not by way of limitation, the items and objects may include groups or social networks to which users of social-networking system 1760 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 1760 or by an external system of third-party system 1770, which is separate from social-networking system 1760 and coupled to social-networking system 1760 via a network 1710.

In particular embodiments, social-networking system 1760 may be capable of linking a variety of entities. As an example and not by way of limitation, social-networking system 1760 may enable users to interact with each other as well as receive content from third-party systems 1770 or other entities, or to allow users to interact with these entities through an application programming interfaces (API) or other communication channels.

In particular embodiments, a third-party system 1770 may include one or more types of servers, one or more data stores, one or more interfaces, including but not limited to APIs, one or more web services, one or more content sources, one or more networks, or any other suitable components, e.g., that servers may communicate with. A third-party system 1770 may be operated by a different entity from an entity operating social-networking system 1760. In particular embodiments, however, social-networking system 1760 and third-party systems 1770 may operate in conjunction with each other to provide social-networking services to users of social-networking system 1760 or third-party systems 1770. In this sense, social-networking system 1760 may provide a platform, or backbone, which other systems, such as third-party systems 1770, may use to provide social-networking services and functionality to users across the Internet.

In particular embodiments, a third-party system 1770 may include a third-party content object provider. A third-party content object provider may include one or more sources of content objects, which may be communicated to a client system 1730. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 1760 also includes user-generated content objects, which may enhance a user's interactions with social-networking system 1760. User-generated content may include anything a user can add, upload, send, or "post" to social-networking system 1760. As an example and not by way of limitation, a user communicates posts to social-networking system 1760 from a client system 1730. Posts may include data such as status updates or other textual data, location information, photos, videos, links, music or other similar data or media. Content may also be added to social-networking system 1760 by a third-party through a "communication channel," such as a newsfeed or stream.

In particular embodiments, social-networking system 1760 may include a variety of servers, sub-systems, programs, modules, logs, and data stores. In particular embodiments, social-networking system 1760 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 1760 may also include suitable components such as network interfaces, security mechanisms, load balancers, failover servers, management-and-network-operations consoles, other suitable components, or any suitable combination thereof. In particular embodiments, social-networking system 1760 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 1760 to one or more client systems 1730 or one or more third-party system 1770 via network 1710. The web server may include a mail server or other messaging functionality for receiving and routing messages between social-networking system 1760 and one or more client systems 1730. An API-request server may allow a third-party system 1770 to access information from social-networking system 1760 by calling one or more APIs. An action logger may be used to receive communications from a web server about a user's actions on or off social-networking system 1760. In conjunction with the action log, a third-party-content-object log may be maintained of user exposures to third-party-content objects. A notification controller may provide information regarding content objects to a client system 1730. Information may be pushed to a client system 1730 as notifications, or information may be pulled from client system 1730 responsive to a request received from client system 1730. Authorization servers may be used to enforce one or more privacy settings of the users of social-networking system 1760. A privacy setting of a user determines how particular information associated with a user can be shared. The authorization server may allow users to opt in to or opt out of having their actions logged by social-networking system 1760 or shared with other systems (e.g., third-party system 1770), such as, for example, by setting appropriate privacy settings. Third-party-content-object stores may be used to store content objects received from third parties, such as a third-party system 1770. Location stores may be used for storing location information received from client systems 1730 associated with users. Advertisement-pricing modules may combine social information, the current time, location information, or other suitable information to provide relevant advertisements, in the form of notifications, to a user.

Figure 18:
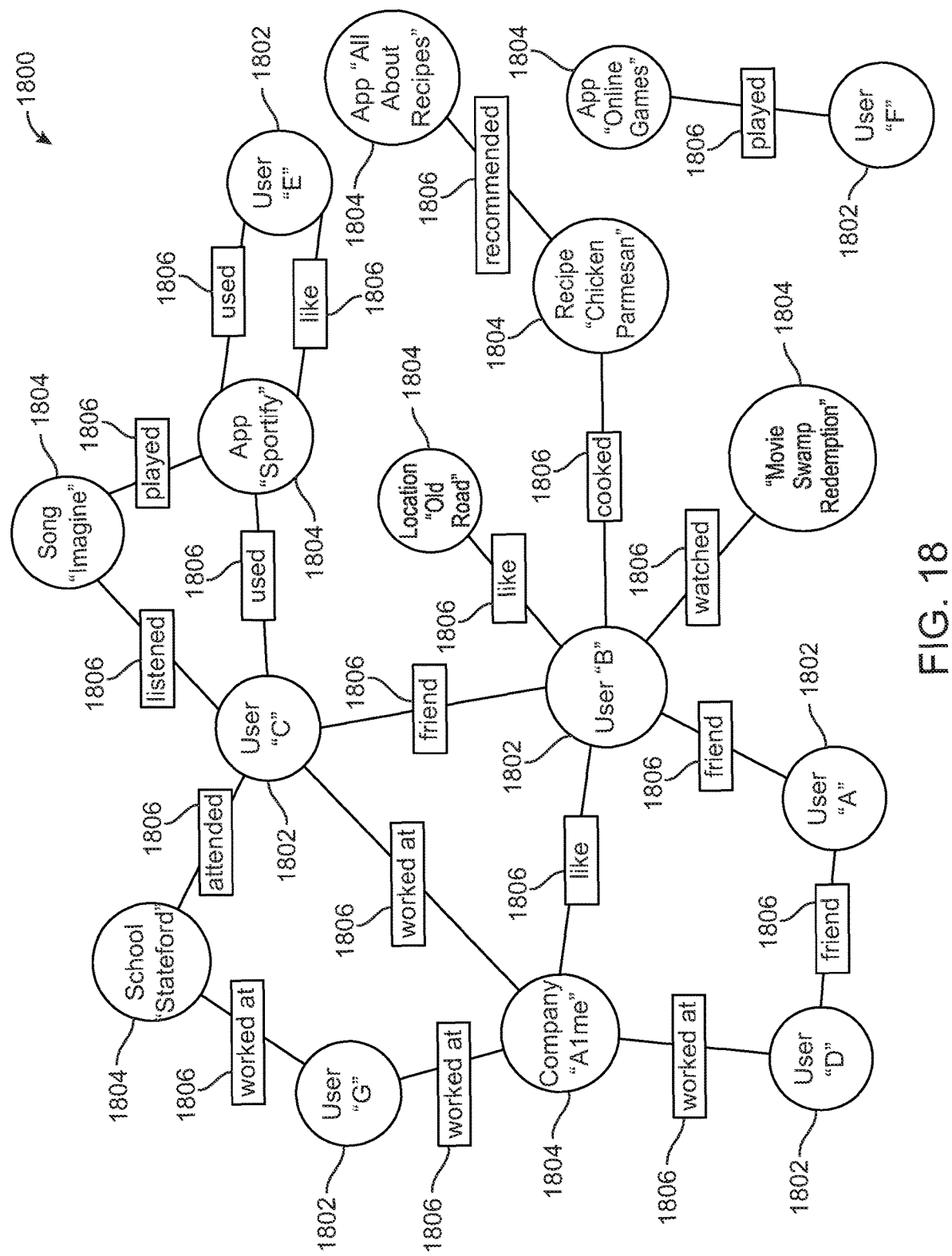
FIG. 18 illustrates an example social graph.

FIG. 18 illustrates example social graph 1800. In particular embodiments, social-networking system 1760 may store one or more social graphs 1800 in one or more data stores. In particular embodiments, social graph 1800 may include multiple nodes—which may include multiple user nodes 1802 or multiple concept nodes 1804—and multiple edges 1806 connecting the nodes. Example social graph 1800 illustrated in FIG. 18 is shown, for didactic purposes, in a two-dimensional visual map representation. In particular embodiments, a social-networking system 1760, client system 1730, or third-party system 1770 may access social graph 1800 and related social-graph information for suitable applications. The nodes and edges of social graph 1800 may be stored as data objects, for example, in a data store (such as a social-graph database). Such a data store may include one or more searchable or queryable indexes of nodes or edges of social graph 1800.

In particular embodiments, a user node 1802 may correspond to a user of social-networking system 1760. As an example and not by way of limitation, a user may be an individual (human user), an entity (e.g., an enterprise, business, or third-party application), or a group (e.g., of individuals or entities) that interacts or communicates with or over social-networking system 1760. In particular embodiments, when a user registers for an account with social-networking system 1760, social-networking system 1760 may create a user node 1802 corresponding to the user, and store the user node 1802 in one or more data stores. Users and user nodes 1802 described herein may, where appropriate, refer to registered users and user nodes 1802 associated with registered users. In addition or as an alternative, users and user nodes 1802 described herein may, where appropriate, refer to users that have not registered with social-networking system 1760. In particular embodiments, a user node 1802 may be associated with information provided by a user or information gathered by various systems, including social-networking system 1760. As an example and not by way of limitation, a user may provide his or her name, profile picture, contact information, birth date, sex, marital status, family status, employment, education background, preferences, interests, or other demographic information. In particular embodiments, a user node 1802 may be associated with one or more data objects corresponding to information associated with a user. In particular embodiments, a user node 1802 may correspond to one or more webpages.

In particular embodiments, a concept node 1804 may correspond to a concept. As an example and not by way of limitation, a concept may correspond to a place (such as, for example, a movie theater, restaurant, landmark, or city); a website (such as, for example, a website associated with social-network system 1760 or a third-party website associated with a web-application server); an entity (such as, for example, a person, business, group, sports team, or celebrity); a resource (such as, for example, an audio file, video file, digital photo, text file, structured document, or application) which may be located within social-networking system 1760 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 1804 may be associated with information of a concept provided by a user or information gathered by various systems, including social-networking system 1760. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1804 may be associated with one or more data objects corresponding to information associated with concept node 1804. In particular embodiments, a concept node 1804 may correspond to one or more webpages.

In particular embodiments, a node in social graph 1800 may represent or be represented by a webpage (which may be referred to as a "profile page"). Profile pages may be hosted by or accessible to social-networking system 1760. Profile pages may also be hosted on third-party websites associated with a third-party system 1770. As an example and not by way of limitation, a profile page corresponding to a particular external webpage may be the particular external webpage and the profile page may correspond to a particular concept node 1804. Profile pages may be viewable by all or a selected subset of other users. As an example and not by way of limitation, a user node 1802 may have a corresponding user-profile page in which the corresponding user may add content, make declarations, or otherwise express himself or herself. As another example and not by way of limitation, a concept node 1804 may have a corresponding concept-profile page in which one or more users may add content, make declarations, or express themselves, particularly in relation to the concept corresponding to concept node 1804.

In particular embodiments, a concept node 1804 may represent a third-party webpage or resource hosted by a third-party system 1770. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 1730 to send to social-networking system 1760 a message indicating the user's action. In response to the message, social-networking system 1760 may create an edge (e.g., a check-in-type edge) between a user node 1802 corresponding to the user and a concept node 1804 corresponding to the third-party webpage or resource and store edge 1806 in one or more data stores.

In particular embodiments, a pair of nodes in social graph 1800 may be connected to each other by one or more edges 1806. An edge 1806 connecting a pair of nodes may represent a relationship between the pair of nodes. In particular embodiments, an edge 1806 may include or represent one or more data objects or attributes corresponding to the relationship between a pair of nodes. As an example and not by way of limitation, a first user may indicate that a second user is a "friend" of the first user. In response to this indication, social-networking system 1760 may send a "friend request" to the second user. If the second user confirms the "friend request," social-networking system 1760 may create an edge 1806 connecting the first user's user node 1802 to the second user's user node 1802 in social graph 1800 and store edge 1806 as social-graph information in one or more of data stores 1764. In the example of FIG. 18, social graph 1800 includes an edge 1806 indicating a friend relation between user nodes 1802 of user "A" and user "B" and an edge indicating a friend relation between user nodes 1802 of user "C" and user "B." Although this disclosure describes or illustrates particular edges 1806 with particular attributes connecting particular user nodes 1802, this disclosure contemplates any suitable edges 1806 with any suitable attributes connecting user nodes 1802. As an example and not by way of limitation, an edge 1806 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1800 by one or more edges 1806.

In particular embodiments, an edge 1806 between a user node 1802 and a concept node 1804 may represent a particular action or activity performed by a user associated with user node 1802 toward a concept associated with a concept node 1804. As an example and not by way of limitation, as illustrated in FIG. 18, a user may "like," "attended," "played," "listened," "cooked," "worked at," or "watched" a concept, each of which may correspond to an edge type or subtype. A concept-profile page corresponding to a concept node 1804 may include, for example, a selectable "check in" icon (such as, for example, a clickable "check in" icon) or a selectable "add to favorites" icon. Similarly, after a user clicks these icons, social-networking system 1760 may create a "favorite" edge or a "check in" edge in response to a user's action corresponding to a respective action. As another example and not by way of limitation, a user (user "C") may listen to a particular song ("Imagine") using a particular application (an online music application). In this case, social-networking system 1760 may create a "listened" edge 1806 and a "used" edge (as illustrated in FIG. 18) between user nodes 1802 corresponding to the user and concept nodes 1804 corresponding to the song and application to indicate that the user listened to the song and used the application. Moreover, social-networking system 1760 may create a "played" edge 1806 (as illustrated in FIG. 18) between concept nodes 1804 corresponding to the song and the application to indicate that the particular song was played by the particular application. In this case, "played" edge 1806 corresponds to an action performed by an external application on an external audio file (the song "Imagine"). Although this disclosure describes particular edges 1806 with particular attributes connecting user nodes 1802 and concept nodes 1804, this disclosure contemplates any suitable edges 1806 with any suitable attributes connecting user nodes 1802 and concept nodes 1804. Moreover, although this disclosure describes edges between a user node 1802 and a concept node 1804 representing a single relationship, this disclosure contemplates edges between a user node 1802 and a concept node 1804 representing one or more relationships. As an example and not by way of limitation, an edge 1806 may represent both that a user likes and has used at a particular concept. Alternatively, another edge 1806 may represent each type of relationship (or multiples of a single relationship) between a user node 1802 and a concept node 1804 (as illustrated in FIG. 18 between user node 1802 for user "E" and concept node 1804).

In particular embodiments, social-networking system 1760 may create an edge 1806 between a user node 1802 and a concept node 1804 in social graph 1800. As an example and not by way of limitation, a user viewing a concept-profile page (such as, for example, by using a web browser or a special-purpose application hosted by the user's client system 1730) may indicate that he or she likes the concept represented by the concept node 1804 by clicking or selecting a "Like" icon, which may cause the user's client system 1730 to send to social-networking system 1760 a message indicating the user's liking of the concept associated with the concept-profile page. In response to the message, social-networking system 1760 may create an edge 1806 between user node 1802 associated with the user and concept node 1804, as illustrated by "like" edge 1806 between the user and concept node 1804. In particular embodiments, social-networking system 1760 may store an edge 1806 in one or more data stores. In particular embodiments, an edge 1806 may be automatically formed by social-networking system 1760 in response to a particular user action. As an example and not by way of limitation, if a first user uploads a picture, watches a movie, or listens to a song, an edge 1806 may be formed between user node 1802 corresponding to the first user and concept nodes 1804 corresponding to those concepts. Although this disclosure describes forming particular edges 1806 in particular manners, this disclosure contemplates forming any suitable edges 1806 in any suitable manner.

In particular embodiments, an advertisement may be text (which may be HTML-linked), one or more images (which may be HTML-linked), one or more videos, audio, other suitable digital object files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social-networking system 1760). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 1760 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 1760) or RSVP (e.g., through social-networking system 1760) to an event associated with the advertisement. In addition or as an alternative, an advertisement may include social-networking-system content directed to the user. As an example and not by way of limitation, an advertisement may display information about a friend of the user within social-networking system 1760 who has taken an action associated with the subject matter of the advertisement.

In particular embodiments, social-networking system 1760 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 1770 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 1760 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 1760 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 1760 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 1760 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 1760 may calculate a coefficient based on a user's actions. Social-networking system 1760 may monitor such actions on the online social network, on a third-party system 1770, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 1760 may calculate a coefficient based on the user's actions with particular types of content. The content may be associated with the online social network, a third-party system 1770, or another suitable system. The content may include users, profile pages, posts, news stories, headlines, instant messages, chat room conversations, emails, advertisements, pictures, video, music, other suitable objects, or any combination thereof. Social-networking system 1760 may analyze a user's actions to determine whether one or more of the actions indicate an affinity for subject matter, content, other users, and so forth. As an example and not by way of limitation, if a user frequently posts content related to "coffee" or variants thereof, social-networking system 1760 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 1760 may calculate a coefficient based on the type of relationship between particular objects. Referencing the social graph 1800, social-networking system 1760 may analyze the number and/or type of edges 1806 connecting particular user nodes 1802 and concept nodes 1804 when calculating a coefficient. As an example and not by way of limitation, user nodes 1802 that are connected by a spouse-type edge (representing that the two users are married) may be assigned a higher coefficient than a user nodes 1802 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, social-networking system 1760 may determine that the user has a higher coefficient with respect to the first photo than the second photo because having a tagged-in-type relationship with content may be assigned a higher weight and/or rating than having a like-type relationship with content. In particular embodiments, social-networking system 1760 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 1760 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 1800. As an example and not by way of limitation, social-graph entities that are closer in the social graph 1800 (i.e., fewer degrees of separation) may have a higher coefficient than entities that are further apart in the social graph 1800.

In particular embodiments, social-networking system 1760 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 1730 of the user). A first user may be more interested in other users or concepts that are closer to the first user. As an example and not by way of limitation, if a user is one mile from an airport and two miles from a gas station, social-networking system 1760 may determine that the user has a higher coefficient for the airport than the gas station based on the proximity of the airport to the user.

In particular embodiments, social-networking system 1760 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 1760 may provide information that is relevant to user's interests and current circumstances, increasing the likelihood that they will find such information of interest. In particular embodiments, social-networking system 1760 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 1760 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 1760 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 1770 (e.g., via an API or other communication channel), or from another suitable system. In response to the request, social-networking system 1760 may calculate the coefficient (or access the coefficient information if it has previously been calculated and stored). In particular embodiments, social-networking system 1760 may measure an affinity with respect to a particular process. Different processes (both internal and external to the online social network) may request a coefficient for a particular object or set of objects. Social-networking system 1760 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 1804 corresponding to a particular photo may have a privacy setting specifying that the photo may only be accessed by users tagged in the photo and their friends. In particular embodiments, privacy settings may allow users to opt in or opt out of having their actions logged by social-networking system 1760 or shared with other systems (e.g., third-party system 1770). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 1770, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 1762 may be authorization/privacy servers for enforcing privacy settings. In response to a request from a user (or other entity) for a particular object stored in a data store 1764, social-networking system 1760 may send a request to the data store 1764 for the object. The request may identify the user associated with the request and may only be sent to the user (or a client system 1730 of the user) if the authorization server determines that the user is authorized to access the object based on the privacy settings associated with the object. If the requesting user is not authorized to access the object, the authorization server may prevent the requested object from being retrieved from the data store 1764, or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Figure 19:
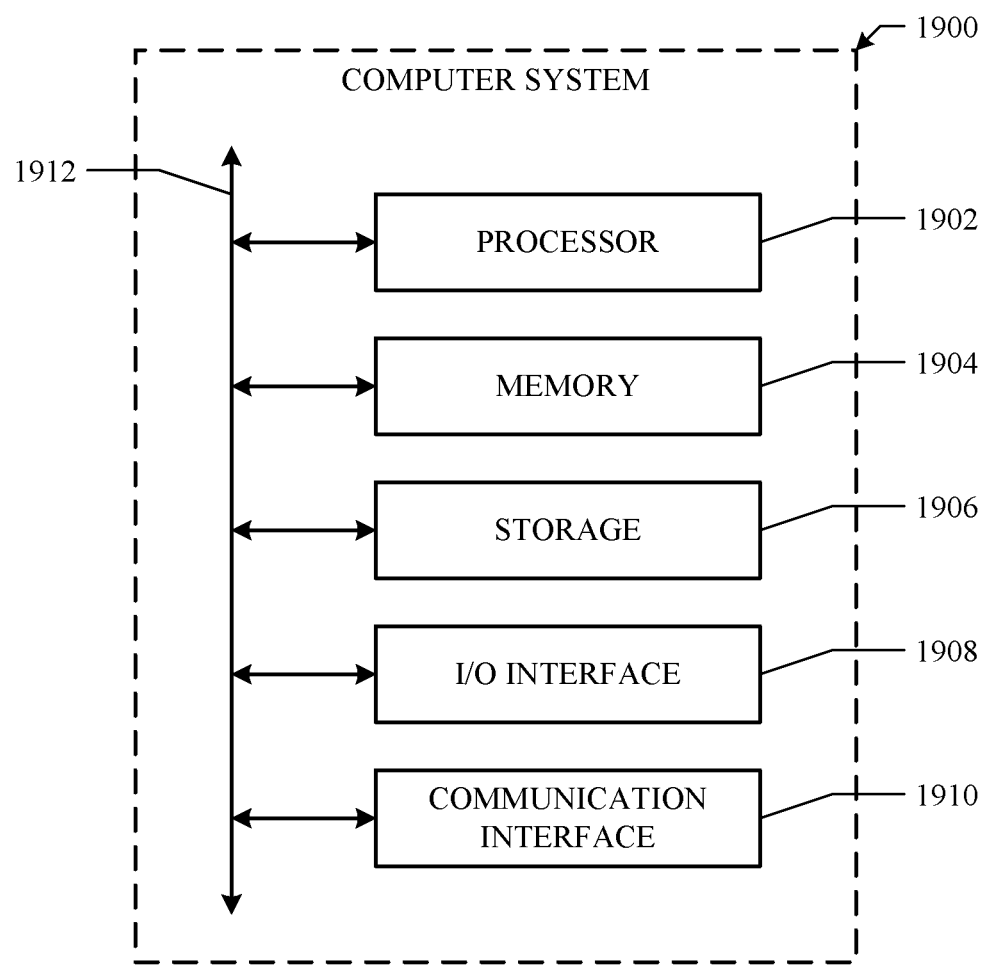
FIG. 19 illustrates an example computer system.

FIG. 19 illustrates an example computer system 1900. In particular embodiments, one or more computer systems 1900 perform one or more steps of one or more methods described or illustrated herein. In particular embodiments, one or more computer systems 1900 provide functionality described or illustrated herein. In particular embodiments, software running on one or more computer systems 1900 performs one or more steps of one or more methods described or illustrated herein or provides functionality described or illustrated herein. Particular embodiments include one or more portions of one or more computer systems 1900. Herein, reference to a computer system may encompass a computing device, and vice versa, where appropriate. Moreover, reference to a computer system may encompass one or more computer systems, where appropriate.

This disclosure contemplates any suitable number of computer systems 1900. This disclosure contemplates computer system 1900 taking any suitable physical form. As example and not by way of limitation, computer system 1900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1900 may include one or more computer systems 1900; be unitary or distributed; span multiple locations; span multiple machines; span multiple data centers; or reside in a cloud, which may include one or more cloud components in one or more networks. Where appropriate, one or more computer systems 1900 may perform without substantial spatial or temporal limitation one or more steps of one or more methods described or illustrated herein. As an example and not by way of limitation, one or more computer systems 1900 may perform in real time or in batch mode one or more steps of one or more methods described or illustrated herein. One or more computer systems 1900 may perform at different times or at different locations one or more steps of one or more methods described or illustrated herein, where appropriate.

In particular embodiments, computer system 1900 includes a processor 1902, memory 1904, storage 1906, an input/output (I/O) interface 1908, a communication interface 1910, and a bus 1912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1902 includes hardware for executing instructions, such as those making up a computer program. As an example and not by way of limitation, to execute instructions, processor 1902 may retrieve (or fetch) the instructions from an internal register, an internal cache, memory 1904, or storage 1906; decode and execute them; and then write one or more results to an internal register, an internal cache, memory 1904, or storage 1906. In particular embodiments, processor 1902 may include one or more internal caches for data, instructions, or addresses. This disclosure contemplates processor 1902 including any suitable number of any suitable internal caches, where appropriate. As an example and not by way of limitation, processor 1902 may include one or more instruction caches, one or more data caches, and one or more translation lookaside buffers (TLBs). Instructions in the instruction caches may be copies of instructions in memory 1904 or storage 1906, and the instruction caches may speed up retrieval of those instructions by processor 1902. Data in the data caches may be copies of data in memory 1904 or storage 1906 for instructions executing at processor 1902 to operate on; the results of previous instructions executed at processor 1902 for access by subsequent instructions executing at processor 1902 or for writing to memory 1904 or storage 1906; or other suitable data. The data caches may speed up read or write operations by processor 1902. The TLBs may speed up virtual-address translation for processor 1902. In particular embodiments, processor 1902 may include one or more internal registers for data, instructions, or addresses. This disclosure contemplates processor 1902 including any suitable number of any suitable internal registers, where appropriate. Where appropriate, processor 1902 may include one or more arithmetic logic units (ALUs); be a multi-core processor; or include one or more processors 1902. Although this disclosure describes and illustrates a particular processor, this disclosure contemplates any suitable processor.

In particular embodiments, memory 1904 includes main memory for storing instructions for processor 1902 to execute or data for processor 1902 to operate on. As an example and not by way of limitation, computer system 1900 may load instructions from storage 1906 or another source (such as, for example, another computer system 1900) to memory 1904. Processor 1902 may then load the instructions from memory 1904 to an internal register or internal cache. To execute the instructions, processor 1902 may retrieve the instructions from the internal register or internal cache and decode them. During or after execution of the instructions, processor 1902 may write one or more results (which may be intermediate or final results) to the internal register or internal cache. Processor 1902 may then write one or more of those results to memory 1904. In particular embodiments, processor 1902 executes only instructions in one or more internal registers or internal caches or in memory 1904 (as opposed to storage 1906 or elsewhere) and operates only on data in one or more internal registers or internal caches or in memory 1904 (as opposed to storage 1906 or elsewhere). One or more memory buses (which may each include an address bus and a data bus) may couple processor 1902 to memory 1904. Bus 1912 may include one or more memory buses, as described below. In particular embodiments, one or more memory management units (MMUs) reside between processor 1902 and memory 1904 and facilitate accesses to memory 1904 requested by processor 1902. In particular embodiments, memory 1904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1904 may include one or more memories 1904, where appropriate. Although this disclosure describes and illustrates particular memory, this disclosure contemplates any suitable memory.

In particular embodiments, storage 1906 includes mass storage for data or instructions. As an example and not by way of limitation, storage 1906 may include a hard disk drive (HDD), a floppy disk drive, flash memory, an optical disc, a magneto-optical disc, magnetic tape, or a Universal Serial Bus (USB) drive or a combination of two or more of these. Storage 1906 may include removable or non-removable (or fixed) media, where appropriate. Storage 1906 may be internal or external to computer system 1900, where appropriate. In particular embodiments, storage 1906 is non-volatile, solid-state memory. In particular embodiments, storage 1906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1906 taking any suitable physical form. Storage 1906 may include one or more storage control units facilitating communication between processor 1902 and storage 1906, where appropriate. Where appropriate, storage 1906 may include one or more storages 1906. Although this disclosure describes and illustrates particular storage, this disclosure contemplates any suitable storage.

In particular embodiments, I/O interface 1908 includes hardware, software, or both, providing one or more interfaces for communication between computer system 1900 and one or more I/O devices. Computer system 1900 may include one or more of these I/O devices, where appropriate. One or more of these I/O devices may enable communication between a person and computer system 1900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1908 for them. Where appropriate, I/O interface 1908 may include one or more device or software drivers enabling processor 1902 to drive one or more of these I/O devices. I/O interface 1908 may include one or more I/O interfaces 1908, where appropriate. Although this disclosure describes and illustrates a particular I/O interface, this disclosure contemplates any suitable I/O interface.

In particular embodiments, communication interface 1910 includes hardware, software, or both providing one or more interfaces for communication (such as, for example, packet-based communication) between computer system 1900 and one or more other computer systems 1900 or one or more networks. As an example and not by way of limitation, communication interface 1910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1910 for it. As an example and not by way of limitation, computer system 1900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1900 may include any suitable communication interface 1910 for any of these networks, where appropriate. Communication interface 1910 may include one or more communication interfaces 1910, where appropriate. Although this disclosure describes and illustrates a particular communication interface, this disclosure contemplates any suitable communication interface.

In particular embodiments, bus 1912 includes hardware, software, or both coupling components of computer system 1900 to each other. As an example and not by way of limitation, bus 1912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1912 may include one or more buses 1912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
   by one or more computing devices, receiving one or more order parameters from a client system of a first user of an online social network, the order parameters comprising an identifier associated with the first user, a location of the client system, and one or more user-specified parameters;
   by the one or more computing devices, receiving a plurality of references to catalog items offered by one or more third-party vendors, wherein each reference is associated with one or more metadata items, one or more of the metadata items for each reference being provided by the respective third-party vendor;
   by the one or more computing devices, scoring each reference of the plurality of references based at least in part on a comparison of the one or more order parameters and the one or more metadata items;
   by the one or more computing devices, sending to the client system of the first user one or more references of the plurality of references that has a score above a threshold score.

2. The method of claim 1, further comprising:
   accessing a social graph maintained by the online social network, the social graph comprising a plurality of nodes and a plurality of edges connecting the nodes, each edge representing a relationship between two of the nodes, wherein:
   a first node corresponds to the first user; and
   a plurality of second nodes each correspond to a second user, an entity, or a concept associated with the online social network.

3. The method of claim 2, wherein the one or more order parameters further comprise a food preference, the food preference being determined by identifying an edge between the first node in the social graph and a second node corresponding to a particular food-type.

4. The method of claim 2, wherein the one or more order parameters further comprise a vendor preference, the vendor preference being determined by identifying an edge between the first node in the social graph and a second node corresponding to a particular vendor.

5. The method of claim 1, wherein the one or more metadata items for each reference comprise a delivery time associated with the respective third-party vendor for the catalog item associated with the reference.

6. The method of claim 1, wherein the one or more metadata items for each reference comprise a user rating associated with the respective third-party vendor for the catalog item associated with the reference.

7. The method of claim 1, wherein each third-party vendor corresponds to a node in a social graph maintained by the online social network, and wherein scoring each reference is further based on a number of edge connections between the node corresponding to the respective third-party vendor and a plurality of users of the online social network, wherein a higher number of edge connections corresponds to an increased score.

8. One or more computer-readable non-transitory storage media embodying software that is operable when executed to:
   receive one or more order parameters from a client system of a first user of an online social network, the order parameters comprising an identifier associated with the first user, a location of the client system, and one or more user-specified parameters;
   receive a plurality of references to catalog items offered by one or more third-party vendors, wherein each reference is associated with one or more metadata items, one or more of the metadata items for each reference being provided by the respective third-party vendor;
   score each reference of the plurality of references based at least in part on a comparison of the one or more order parameters and the one or more metadata items;
   send to the client system of the first user one or more references of the plurality of references that has a score above a threshold score.

9. The media of claim 8, wherein the software is further operable when executed to access a social graph maintained by the online social network, the social graph comprising a plurality of nodes and a plurality of edges connecting the nodes, each edge representing a relationship between two of the nodes, wherein:
   a first node corresponds to the first user; and
   a plurality of second nodes each correspond to a second user, an entity, or a concept associated with the online social network.

10. The media of claim 9, wherein the one or more order parameters further comprise a food preference, the food preference being determined by identifying an edge between the first node in the social graph and a second node corresponding to a particular food-type.

11. The media of claim 9, wherein the one or more order parameters further comprise a vendor preference, the vendor preference being determined by identifying an edge between the first node in the social graph and a second node corresponding to a particular vendor.

12. The media of claim 8, wherein the one or more metadata items for each reference comprise a delivery time associated with the respective third-party vendor for the catalog item associated with the reference.

13. The media of claim 8, wherein the one or more metadata items for each reference comprise a user rating associated with the respective third-party vendor for the catalog item associated with the reference.

14. The media of claim 8, wherein each third-party vendor corresponds to a node in a social graph maintained by the online social network, and wherein scoring each reference is further based on a number of edge connections between the node corresponding to the respective third-party vendor and a plurality of users of the online social network, wherein a higher number of edge connections corresponds to an increased score.

15. A system comprising:
one or more processors; and
one or more computer-readable non-transitory storage media coupled to one or more of the processors and comprising instructions operable when executed by one or more of the processors to cause the system to:
receive one or more order parameters from a client system of a first user of an online social network, the order parameters comprising an identifier associated with the first user a location of the client system, and one or more user-specified parameters;
receive a plurality of references to catalog items offered by one or more third-party vendors, wherein each reference is associated with one or more metadata items, one or more of the metadata items for each reference being provided by the respective third-party vendor;
score each reference of the plurality of references based at least in part on a comparison of the one or more order parameters and the one or more metadata items;
send to the client system of the first user one or more references of the plurality of references that has a score above a threshold score.

16. The system of claim 15, wherein the processors are further operable when executing the instructions to access a social graph maintained by the online social network, the social graph comprising a plurality of nodes and a plurality of edges connecting the nodes, each edge representing a relationship between two of the nodes, wherein:
a first node corresponds to the first user; and
a plurality of second nodes each correspond to a second user, an entity, or a concept associated with the online social network.

17. The system of claim 16, wherein the one or more order parameters further comprise a food preference, the food preference being determined by identifying an edge between the first node in the social graph and a second node corresponding to a particular food-type.

18. The system of claim 16, wherein the one or more order parameters further comprise a vendor preference, the vendor preference being determined by identifying an edge between the first node in the social graph and a second node corresponding to a particular vendor.

19. The system of claim 15, wherein the one or more metadata items for each reference comprise a delivery time associated with the respective third-party vendor for the catalog item associated with the reference.

20. The system of claim 15, wherein the one or more metadata items for each reference comprise a user rating associated with the respective third-party vendor for the catalog item associated with the reference.

* * * * *